(12) United States Patent
LeGrand et al.

(10) Patent No.: US 11,249,477 B2
(45) Date of Patent: Feb. 15, 2022

(54) SIX DEGREE OF FREEDOM AERIAL VEHICLE HAVING RECONFIGURABLE PROPELLERS

(71) Applicant: Amazon Technologies, Inc., Seattle, WA (US)

(72) Inventors: Louis LeGrand, Seattle, WA (US); Omri Rand, Seattle, WA (US); Gur Kimchi, Seattle, WA (US); Sebastian Fischer, Seattle, WA (US); Ricky Welsh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 778 days.

(21) Appl. No.: 16/133,592

(22) Filed: Sep. 17, 2018

(65) Prior Publication Data

US 2020/0089227 A1 Mar. 19, 2020

(51) Int. Cl.
*G05D 1/00* (2006.01)
*B64C 29/02* (2006.01)
(Continued)

(52) U.S. Cl.
CPC ............ *G05D 1/0072* (2013.01); *B64C 27/08* (2013.01); *B64C 27/57* (2013.01); *B64C 29/02* (2013.01);
(Continued)

(58) Field of Classification Search
CPC ...... G05D 1/0072; B64C 29/02; B64C 39/08; B64C 39/024; B64C 27/57; B64C 27/08;
(Continued)

(56) References Cited

U.S. PATENT DOCUMENTS

| 2,952,422 A | 9/1960 | Fletcher et al. |
| 3,350,035 A * | 10/1967 | Schlieben ............. B64C 39/062 244/7 R |

(Continued)

FOREIGN PATENT DOCUMENTS

| CA | 2967228 A1 | 11/2017 |
| CN | 103625640 A | 3/2014 |

(Continued)

OTHER PUBLICATIONS

International Search Report & Written Opinion dated Dec. 12, 2019, in corresponding International Application Mo. PCT/US2019/050831, 15 pages.

(Continued)

*Primary Examiner* — Valentina Xavier
(74) *Attorney, Agent, or Firm* — Athorus, PLLC

(57) ABSTRACT

Various reconfigurations of propellers, propeller blades, and/or blade sections of propulsion mechanisms of an aerial vehicle are described. For example, responsive to a fault or failure of a propulsion mechanism, propellers, propeller blades, and/or blade sections of the remaining propulsion mechanisms may be modified to maintain control and safety of the aerial vehicle. In example embodiments, angular orientations, positions, and/or lengths of one or more propellers, propeller blades, and/or blade sections of propulsion mechanisms may be modified to maintain control and safety in either a horizontal, wingborn flight orientation, or a vertical, VTOL flight orientation.

17 Claims, 15 Drawing Sheets

(51) Int. Cl.
*B64C 39/08* (2006.01)
*B64C 39/02* (2006.01)
*B64C 27/57* (2006.01)
*B64C 27/08* (2006.01)

(52) U.S. Cl.
CPC ............ *B64C 39/024* (2013.01); *B64C 39/08* (2013.01); *B64C 2201/021* (2013.01); *B64C 2201/024* (2013.01); *B64C 2201/104* (2013.01); *B64C 2201/108* (2013.01)

(58) Field of Classification Search
CPC ... B64C 2201/108; B64C 11/46; B64C 11/30; B64C 11/003; B64C 2201/027; B64C 39/062
See application file for complete search history.

(56) References Cited

U.S. PATENT DOCUMENTS

| | | | |
|---|---|---|---|
| 4,280,673 | A | 7/1981 | Brzack |
| 4,345,401 | A | 8/1982 | Brzack |
| 7,988,088 | B2 | 8/2011 | Konstantinovskiy |
| 8,262,016 | B2 | 9/2012 | Gosling |
| 9,481,457 | B2 | 11/2016 | Alber |
| 9,499,266 | B1 | 11/2016 | Garreau |
| 9,550,567 | B1 * | 1/2017 | Erdozain, Jr. ............ B64C 29/02 |
| 9,725,170 | B2 * | 8/2017 | Daler ..................... B64C 17/00 |
| 9,821,909 | B2 | 11/2017 | Moshe |
| 10,059,442 | B2 | 8/2018 | Olm et al. |
| 10,232,950 | B2 | 3/2019 | McCullough et al. |
| 10,252,796 | B2 | 4/2019 | Reichert |
| 10,414,483 | B2 | 9/2019 | Ivans et al. |
| 10,435,176 | B2 | 10/2019 | McClure et al. |
| 10,450,063 | B1 * | 10/2019 | Randall .................. B64C 29/02 |
| 10,518,880 | B2 * | 12/2019 | Kimchi ................. B64C 39/062 |
| 10,556,680 | B2 | 2/2020 | Fenny et al. |
| 10,618,649 | B2 * | 4/2020 | Champagne, Jr. .... B64C 39/024 |
| 10,676,183 | B2 | 6/2020 | Fenny et al. |
| 10,723,453 | B2 | 7/2020 | Scott et al. |
| 10,730,624 | B2 | 8/2020 | Fenny et al. |
| 10,737,786 | B2 | 8/2020 | Fenny et al. |
| 10,814,974 | B2 * | 10/2020 | Randall ................. B64C 39/062 |
| D917,340 | S * | 4/2021 | Welsh ......................... D12/16.1 |
| 10,981,649 | B2 * | 4/2021 | LeGrand ................. B64C 27/26 |
| 11,091,263 | B2 * | 8/2021 | Kimchi ................... B64C 11/46 |
| 2004/0240998 | A1 | 12/2004 | Ashworth |
| 2006/0226281 | A1 | 10/2006 | Walton |
| 2007/0023581 | A1 | 2/2007 | La |
| 2007/0215746 | A1 * | 9/2007 | Rieken ................... B64C 39/06 244/6 |
| 2008/0087763 | A1 | 4/2008 | Sheahan et al. |
| 2009/0302150 | A1 | 12/2009 | Konstantinovskiy |
| 2010/0044496 | A1 | 2/2010 | Gosling |
| 2011/0042509 | A1 | 2/2011 | Bevirt et al. |
| 2011/0147533 | A1 | 6/2011 | Goossen et al. |
| 2012/0248259 | A1 | 10/2012 | Page et al. |
| 2013/0206915 | A1 | 8/2013 | Desaulniers |
| 2016/0016652 | A1 | 1/2016 | Barrett et al. |
| 2016/0272310 | A1 | 9/2016 | Chan et al. |
| 2016/0355260 | A1 | 12/2016 | Herber et al. |
| 2017/0057630 | A1 * | 3/2017 | Schwaiger ............. B64D 27/04 |
| 2017/0313433 | A1 * | 11/2017 | Ozaki .................... B64C 39/024 |
| 2018/0002011 | A1 | 1/2018 | McCullough et al. |
| 2018/0155011 | A1 | 6/2018 | Greiner et al. |
| 2018/0186445 | A1 | 7/2018 | Fenny et al. |
| 2018/0215462 | A1 | 8/2018 | Fenny et al. |
| 2018/0229839 | A1 | 8/2018 | Kimchi et al. |
| 2018/0244364 | A1 | 8/2018 | Fenny et al. |
| 2018/0244376 | A1 | 8/2018 | Fenny et al. |
| 2018/0244381 | A1 | 8/2018 | Fenny et al. |
| 2018/0290736 | A1 * | 10/2018 | Mikic ...................... B64C 27/08 |
| 2020/0070972 | A1 | 3/2020 | Fischer et al. |
| 2020/0081432 | A1 | 3/2020 | Szmuk et al. |
| 2020/0086984 | A1 | 3/2020 | LeGrand et al. |
| 2020/0086985 | A1 | 3/2020 | LeGrand et al. |
| 2020/0089227 | A1 | 3/2020 | LeGrand et al. |
| 2020/0094961 | A1 | 3/2020 | Kimchi et al. |
| 2020/0148354 | A1 | 5/2020 | Morris et al. |
| 2020/0239150 | A1 | 7/2020 | Kimchi et al. |

FOREIGN PATENT DOCUMENTS

| | | |
|---|---|---|
| DE | 102009033821 A1 | 1/2011 |
| EP | 1775214 A1 | 4/2007 |
| FR | 3049575 B1 | 8/2019 |
| GB | 2462452 B | 2/2011 |
| WO | 2001030652 A1 | 5/2001 |
| WO | 2010015866 A2 | 2/2010 |
| WO | 2011131733 A2 | 10/2011 |
| WO | 2015150529 A1 | 10/2015 |
| WO | 2016089882 A1 | 6/2016 |

OTHER PUBLICATIONS

Andrew Rosenblum et al, "The Jets of the Future," May 1, 2012, Retrieved from the Internet on Mar. 27, 2018: URL: https://www.popsci.com/technology/article/2012-04/jets-future, pp. 1-9.

Dirtflare, "Ring Wing VTOL!!!," Specifications Ring Wing VTOL!!!, Aug. 1, 2016, Retrieved from the Internet on Mar. 22, 2018: URL: https://www.simpleplanes.com/a/Mo2vSy/Ring-Wing-VTOL, pp. 1-2.

* cited by examiner

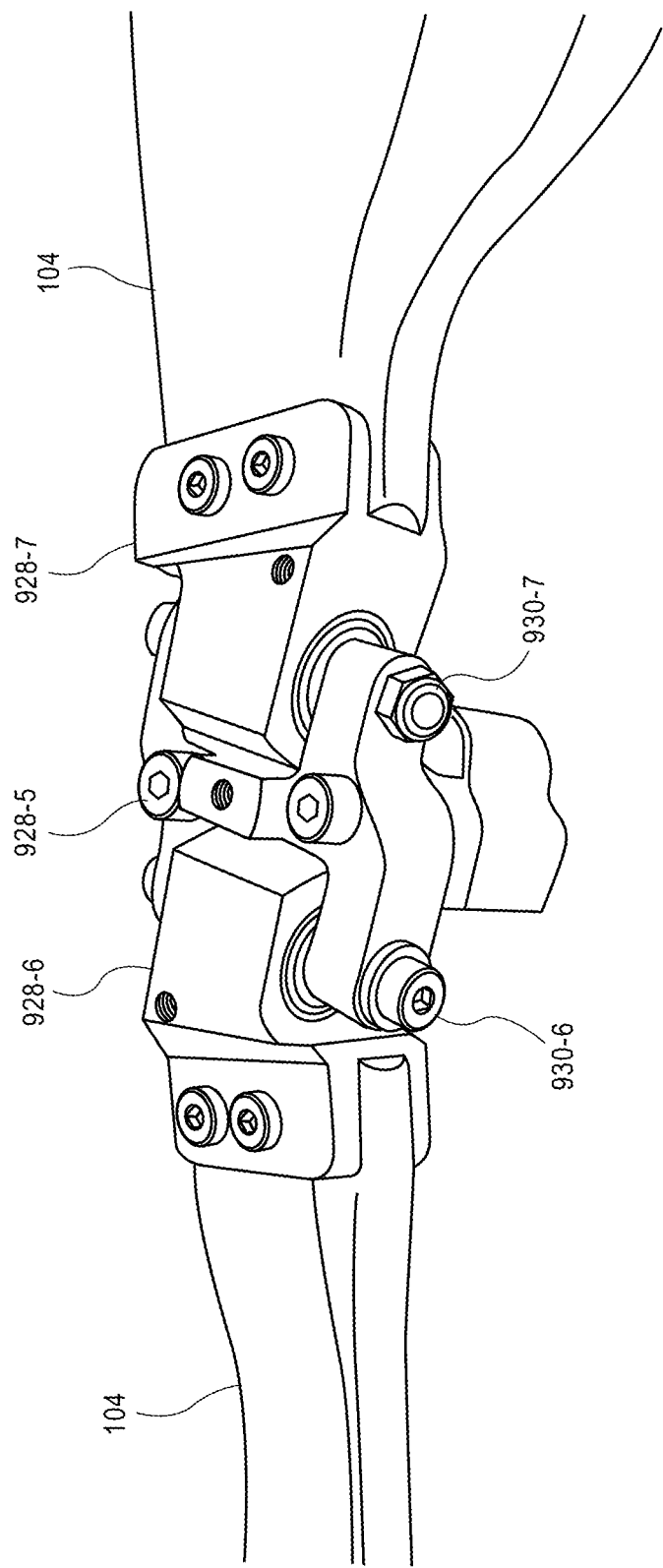

SIX DEGREE OF FREEDOM AERIAL VEHICLE HAVING RECONFIGURABLE PROPELLERS

CROSS-REFERENCE TO RELATED APPLICATION

This application is related to U.S. application Ser. No. 15/435,121, filed Feb. 16, 2017, entitled "Six Degree of Freedom Aerial Vehicle with a Ring Wing," which is incorporated herein by reference in its entirety.

BACKGROUND

Unmanned vehicles, such as unmanned aerial vehicles ("UAV"), ground and water based automated vehicles, are continuing to increase in use. For example, UAVs are often used by hobbyists to obtain aerial images of buildings, landscapes, etc. Likewise, unmanned ground based units are often used in materials handling facilities to autonomously transport inventory within the facility. While there are many beneficial uses of these vehicles, balancing the tightly coupled vehicle performance parameters of stability, maneuverability, and energy efficiency introduces design complexities of the UAVs. For example, due to current design limitations, design tradeoffs exist between optimizing UAVs for high agility versus high energy efficiency. Likewise, aerial vehicles are designed to only operate with four degrees of freedom—pitch, yaw, roll, and heave. In addition, aerial vehicles are generally designed assuming a fully operational state. Accordingly, there is a need for systems and methods to maintain control and safety of aerial vehicles even in degraded operational states.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 9A and 9B illustrate views of a propeller hub of a propulsion mechanism having hinged, flapping propeller blades, in accordance with disclosed implementations.

Figure 1:
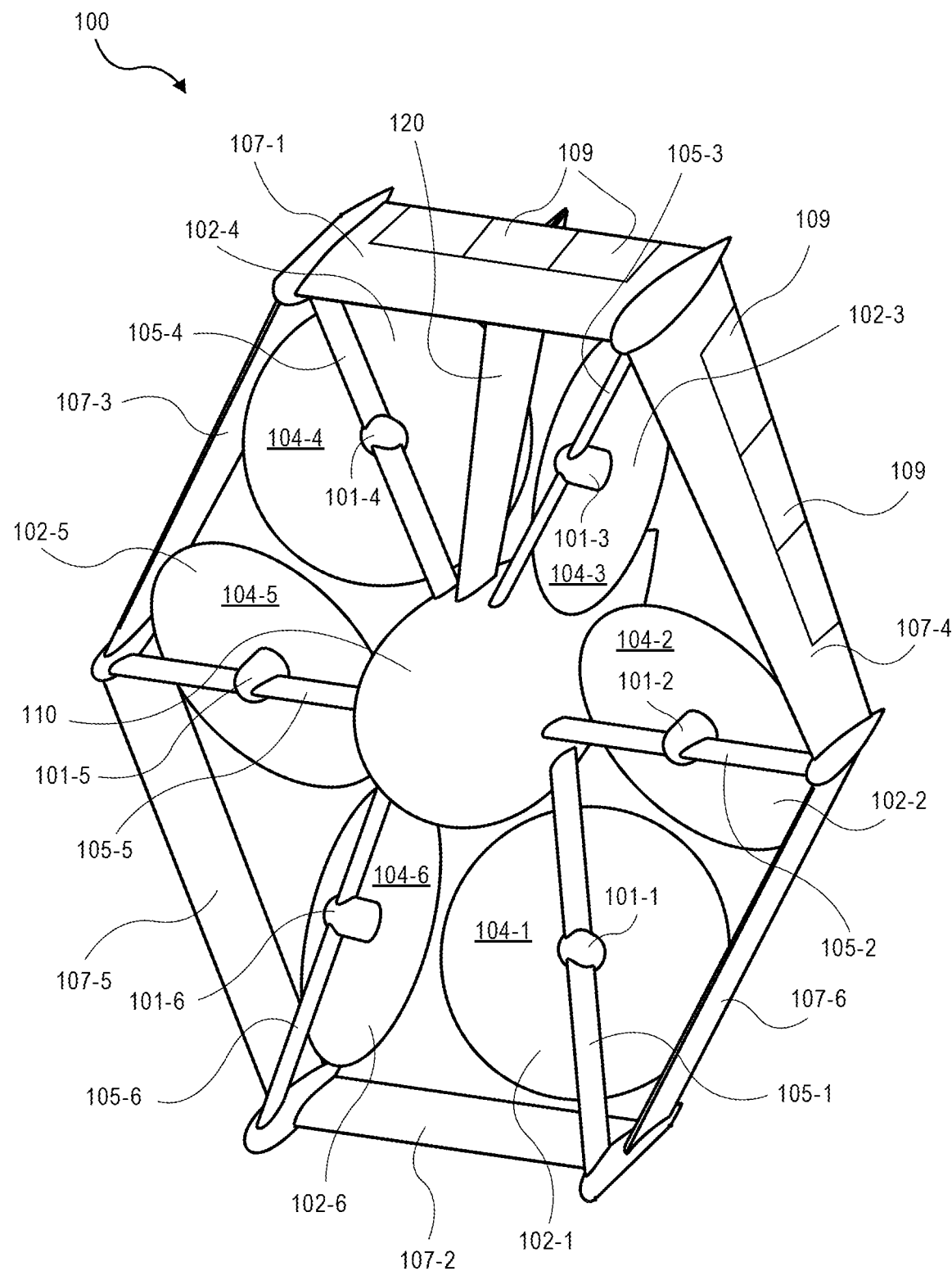
FIGS. 1-4 illustrate various views of an aerial vehicle with a substantially hexagonal shaped ring wing, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes aerial vehicles, such as UAVs (e.g., quad-copters, hex-copters, hepta-copters, octa-copters) that can operate in a vertical takeoff and landing (VTOL) orientation or in a horizontal flight orientation. Likewise, when the aerial vehicle is in a VTOL orientation, it can transition independently in any of the six degrees of freedom. Specifically, as described herein, the aerial vehicles may efficiently rotate in any of the three degrees of freedom of rotation (pitch, yaw, and roll) and/or may efficiently move in any of the three degrees of freedom of translation (surge, heave, and sway). For example, the aerial vehicle may include six propulsion mechanisms that are oriented at different angles and therefore, together, can provide thrust in the vertical direction and/or the horizontal direction when the aerial vehicle is in a VTOL orientation.

As discussed further below, a ring wing is included on the aerial vehicle that surrounds the propulsion mechanisms of the aerial vehicle and provides both protection around the propulsion mechanisms and lift when the aerial vehicle is in the horizontal flight orientation and navigating in a substantially horizontal direction.

In addition, responsive to degraded functional states of aerial vehicles such as motor out situations, the aerial vehicles described herein may implement one or more reconfigurations to maintain control of the aerial vehicles and land the aerial vehicles at safe landing locations. In one example embodiment, an aerial vehicle that has detected a failed propulsion mechanism may reconfigure angles of one or more propellers of propulsion mechanisms. In other example embodiments, an aerial vehicle that has detected a failed propulsion mechanism may reconfigure orientations of one or more control surfaces, trim tabs, and/or sections of propeller blades of one or more propulsion mechanisms. In further example embodiments, an aerial vehicle that has detected a failed propulsion mechanism may reconfigure lengths of one or more sections of propeller blades of one or more propulsion mechanisms. In still further example embodiments, various combinations of reconfigurations may be implemented, and some of the various combinations may include planarizing propellers of two or more propulsion mechanisms, changing orientations of propellers, propeller blades, and/or sections of propeller blades of one or more propulsion mechanisms, and/or changing lengths of propellers, propeller blades, and/or sections of propeller blades of one or more propulsion mechanisms.

Moreover, although aerial vehicle reconfigurations of one or more propellers are described herein generally in the context of degraded functional or operational states of aerial vehicles, in some example embodiments, various of the aerial vehicle reconfigurations may be performed even in fully functional states or other operational states of aerial vehicles. In this manner, the propellers may be modified as described herein to improve or increase controllability of aerial vehicles even in the absence of any particular faults or failures of one or more components of aerial vehicles.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items (also referred to herein as a payload) may be delivered. For example, the delivery location may be a person's residence, a place of business, a location within a materials handling facility (e.g., packing station, inventory storage), or any location where a user or inventory is located, etc. Inventory or items may be any physical goods that can be transported using an aerial vehicle. For example, an item carried by a payload of an aerial vehicle discussed herein may be ordered by a customer of an electronic commerce website and aerially delivered by the aerial vehicle to a delivery location.

FIG. 1 illustrates a view of an aerial vehicle 100 with a ring wing that is substantially hexagonal in shape and that surrounds a plurality of propulsion mechanisms, according to disclosed implementations. The aerial vehicle 100 includes six propulsion mechanisms 102-1, 102-2, 102-3, 102-4, 102-5, and 102-6 spaced about the fuselage 110 of the aerial vehicle 100. As discussed above, while the propulsion mechanisms 102 may include motors 101-1, 101-2, 101-3, 101-4, 101-5, and 101-6 and propellers 104-1, 104-2, 104-3, 104-4, 104-5, and 104-6, in other implementations, other forms of propulsion may be utilized as the propulsion mechanisms 102. For example, one or more of the propulsion mechanisms 102 of the aerial vehicle 100 may utilize fans, jets, turbojets, turbo fans, jet engines, and/or the like to maneuver the aerial vehicle. Generally described, a propulsion mechanism 102, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 102-1, 102-2, 102-3, 102-4, 102-5, and 102-6) may be configured such that their individual orientations may be dynamically modified (e.g., change from vertical to horizontal flight orientation or any position therebetween).

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

In this implementation, the aerial vehicle 100 also includes a ring wing 107 having a substantially hexagonal shape that extends around and forms the perimeter of the aerial vehicle 100. In the illustrated example, the ring wing has six sections or segments 107-1, 107-2, 107-3, 107-4, 107-5, and 107-6 that are joined at adjacent ends to form the ring wing 107 around the aerial vehicle 100. Each segment of the ring wing 107 has an airfoil shape to produce lift when the aerial vehicle is oriented as illustrated in FIG. 1 and moving in a direction that is substantially horizontal. As illustrated, and discussed further below, the ring wing is positioned at an angle with respect to the fuselage 110 such that the lower segment 107-2 of the ring wing acts as a front wing as it is toward the front of the aerial vehicle when oriented as shown and moving in a horizontal direction. The upper segment 107-1 of the ring wing, which has a longer chord length than the lower segment 107-2 of the ring wing 107, is farther back and thus acts as a rear wing.

The ring wing 107 is secured to the fuselage 110 by motor arms 105. In this example, all six motor arms 105-1, 105-2, 105-3, 105-4, 105-5, and 105-6 are coupled to the fuselage at one end, extend from the fuselage 110 and couple to the ring wing 107 at a second end, thereby securing the ring wing 107 to the fuselage 110. In other implementations, less than all of the motor arms may extend from the fuselage 110 and couple to the ring wing 107. For example, motor arms 105-2 and 105-5 may be coupled to the fuselage 110 at one end and extend outward from the fuselage but not couple to the ring wing 107.

In some implementations, the aerial vehicle may also include one or more stabilizer fins 120 that extend from the fuselage 110 to the ring wing 107. The stabilizer fin 120 may also have an airfoil shape. In the illustrated example, the stabilizer fin 120 extends vertically from the fuselage 110 to the ring wing 107. In other implementations, the stabilizer fin may be at other positions. For example, the stabilizer fin may extend downward from the fuselage between motor arm 105-1 and motor arm 105-6.

In general, one or more stabilizer fins may extend from the fuselage 110, between any two motor arms 105 and couple to an interior of the ring wing 107. For example, stabilizer fin 120 may extend upward between motor arms 105-3 and 105-4, a second stabilizer fin may extend from the fuselage and between motor arms 105-5 and 105-6, and a third stabilizer fin may extend from the fuselage and between motor arms 105-1 and 105-2.

Likewise, while the illustrated example shows the motor arm extending from the fuselage 110 at one end and coupling to the interior of the ring wing 107 at a second end, in other implementations, one or more of the stabilizer fin(s) may extend from the fuselage and not couple to the ring wing or may extend from the ring wing and not couple to the fuselage. In some implementations, one or more stabilizer fins may extend from the exterior of the ring wing 107, one or more stabilizer fins may extend from the interior of the ring wing 107, one or more stabilizer fins may extend from the fuselage 110, and/or one or more stabilizer fins may extend from the fuselage 110 and couple to the interior of the ring wing 107.

The fuselage 110, motor arms 105, stabilizer fin 120, and ring wing 107 of the aerial vehicle 100 may be formed of any one or more suitable materials, such as graphite, carbon fiber, and/or aluminum.

Each of the propulsion mechanisms 102 are coupled to a respective motor arm 105 (or propulsion mechanism arm) such that the propulsion mechanism 102 is substantially contained within the perimeter of the ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102-1, 102-2, 102-3, 102-4, 102-5, and 102-6 is coupled at an approximate mid-point of the respective motor arm 105-1, 105-2, 105-3, 105-4, 105-5, and 105-6 between the fuselage 110 and the ring wing 107. In other embodiments, some propulsion mechanisms 102 may be coupled toward an end of the respective motor arm 105. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 110 or closer toward the ring wing 107).

As illustrated, the propulsion mechanisms 102 may be oriented at different angles with respect to each other. For example, propulsion mechanisms 102-2 and 102-5 are aligned with the fuselage 110 such that the force generated by each of propulsion mechanisms 102-2 and 102-5 is in-line or in the same direction or orientation as the fuselage. In the illustrated example, the aerial vehicle 100 is oriented for horizontal flight such that the fuselage is oriented horizontally in the direction of travel. In such an orientation, the propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage 110. When the aerial vehicle 100 is oriented horizontally as shown in FIG. 1 for horizontal flight, the propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, the propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5.

In some implementations, one or more segments of the ring wing 107 may include ailerons, control surfaces, and/or trim tabs 109 that may be adjusted to control the aerial flight of the aerial vehicle 100. For example, one or more ailerons, control surfaces, and/or trim tabs 109 may be included on the upper segment 107-1 of the ring wing 107 and/or one or more ailerons, control surfaces, and/or trim tabs 109 may be included on the side segments 107-4 and/or 107-3. Further, one or more ailerons, control surfaces, and/or trim tabs 109 may also be included on one or more of the remaining segments 107-2, 107-5, and 107-6. The ailerons, control surfaces, and/or trim tabs 109 may be operable to control the pitch, yaw, and/or roll of the aerial vehicle during horizontal flight when the aerial vehicle 100 is oriented as illustrated in FIG. 1.

The angle of orientation of each of the propulsion mechanism 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about the second motor arm 105-2 and oriented toward propulsion mechanism 102-3. Finally, propulsion mechanism 102-4 is oriented approximately thirty degrees in the first direction about the fourth motor arm 105-4 and toward propulsion 102-5. As illustrated, propulsion mechanisms 102-2 and 102-5, which are on opposing sides of the fuselage 110, are aligned and oriented in a same first direction (in this example, horizontal). Propulsion mechanisms 102-3 and 102-6, which are on opposing sides of the fuselage 110, are aligned and oriented in a same second direction, which is angled compared to the first direction. Propulsion mechanisms 102-1 and 102-4, which are on opposing sides of the fuselage 110, are aligned and oriented in a same third direction, which is angled compared to the first direction and the second direction.

Figure 2:
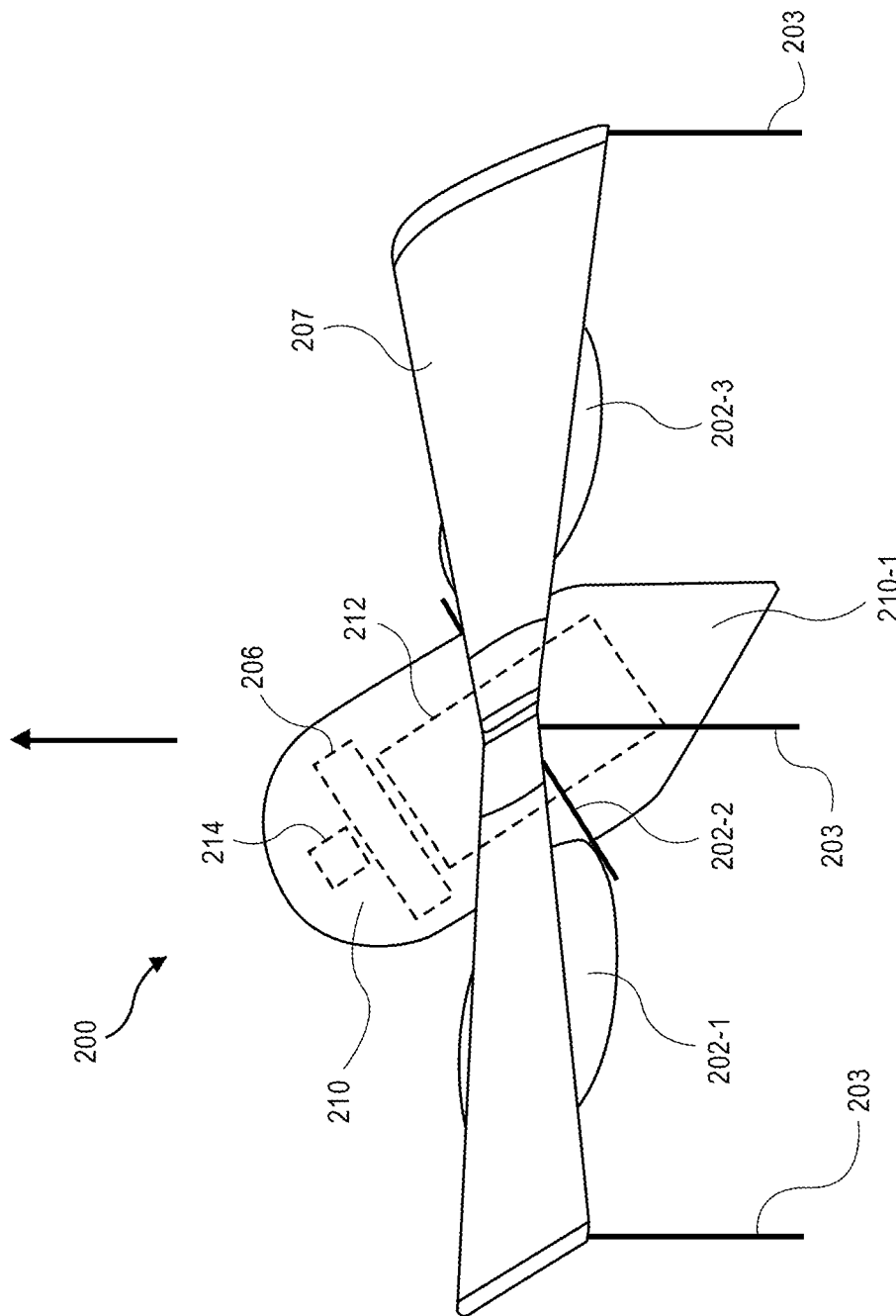

FIG. 2 illustrates a side view of the aerial vehicle 200 oriented for vertical takeoff and landing (VTOL), in accordance with disclosed implementations. The aerial vehicle 200 corresponds to the aerial vehicle 100 discussed above with respect to FIG. 1. When oriented as illustrated in FIG. 2, the aerial vehicle may maneuver in any of the six degrees of freedom (pitch, yaw, roll, heave, surge, and sway), thereby enabling VTOL and high maneuverability.

As illustrated, when the aerial vehicle is oriented for VTOL, the motor arms and the ring wing 207 are aligned approximately horizontally and in the same plane. In this orientation, each of the propulsion mechanisms are offset or angled with respect to the horizontal and/or vertical direction. As such, each propulsion mechanism 202, when generating a force, generates a force that includes both a horizontal component and a vertical component. In the illustrated example, each propulsion mechanism is angled approximately thirty degrees with respect to vertical. Likewise, as discussed above, adjacent propulsion mechanisms are angled in opposing directions to form pairs of propulsion mechanisms. For example, propulsion mechanism 202-2 is oriented toward propulsion mechanism 202-3. As discussed further below, angling adjacent propulsion mechanisms toward one another to form pairs of propulsion mechanisms allows horizontal forces from each propulsion mechanism to cancel out such that the pair of propulsion mechanisms can produce a net vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when the aerial vehicle 200 is oriented for VTOL with angled propulsion mechanisms, as illustrated in FIG. 2, the aerial vehicle can move independently in any of the six degrees of freedom. For example, if the aerial vehicle is to surge in the X direction, it can do so by altering the forces produced by the propulsion mechanisms to generate a net horizontal force in the X direction without having to pitch forward to enable a surge in the X direction.

To enable the fuselage to be oriented horizontally with an offset ring wing 207 during horizontal flight, as illustrated in FIG. 1, the fuselage is rotated at an angle when the aerial vehicle 200 is oriented for VTOL, as illustrated in FIG. 2. In this example the fuselage 210 is angled at approximately thirty degrees from vertical. In other implementations, the amount of rotation from vertical may be greater or less depending on the amount of offset desired for the ring wing 207 when the aerial vehicle 200 is oriented for horizontal flight.

The aerial vehicle may also include one or more landing gears 203 that are extendable to a landing position, as illustrated in FIG. 2. During flight, the landing gear 203 may be retracted into the interior of the ring wing 207 and/or may be rotated up and remain along the trailing edge of the ring wing. In still other examples, the landing gear may be permanently affixed.

The fuselage 210 may be used to house or store one or more components of the aerial vehicle, such as the aerial vehicle control system 214, a power module 206, and/or a payload 212 that is transported by the aerial vehicle. The aerial vehicle control system is discussed further below. The power module(s) 206 may be removably mounted to the aerial vehicle 200. The power module(s) 206 for the aerial vehicle may be, for example, in the form of battery power, solar power, gas power, super capacitor, fuel cell, alternative power generation source, or a combination thereof. The power module(s) 206 are coupled to and provide power for the aerial vehicle control system 214, the propulsion mechanisms 202, and the payload engagement module 210-1.

In some implementations, one or more of the power modules may be configured such that it can be autonomously removed and/or replaced with another power module. For example, when the aerial vehicle lands at a delivery location, relay location and/or materials handling facility, the aerial vehicle may engage with a charging member at the location that will recharge the power module.

The payload 212 may be any payload that is to be transported by the aerial vehicle. In some implementations, the aerial vehicle may be used to aerially deliver items ordered by customers for aerial delivery and the payload may include one or more customer ordered items. For example, a customer may order an item from an electronic commerce website and the item may be delivered to a customer specified delivery location using the aerial vehicle 200.

In some implementations, the fuselage 210 may include a payload engagement module 210-1. For example, the payload engagement module 210-1 may be a hinged portion of the fuselage 210 that can rotate between an open position, in which the interior of the fuselage is accessible so that the payload 212 may be added to or removed from the fuselage, and a closed position, as illustrated in FIG. 2, so that the payload 212 is secured within the interior of the fuselage.

Figure 3:
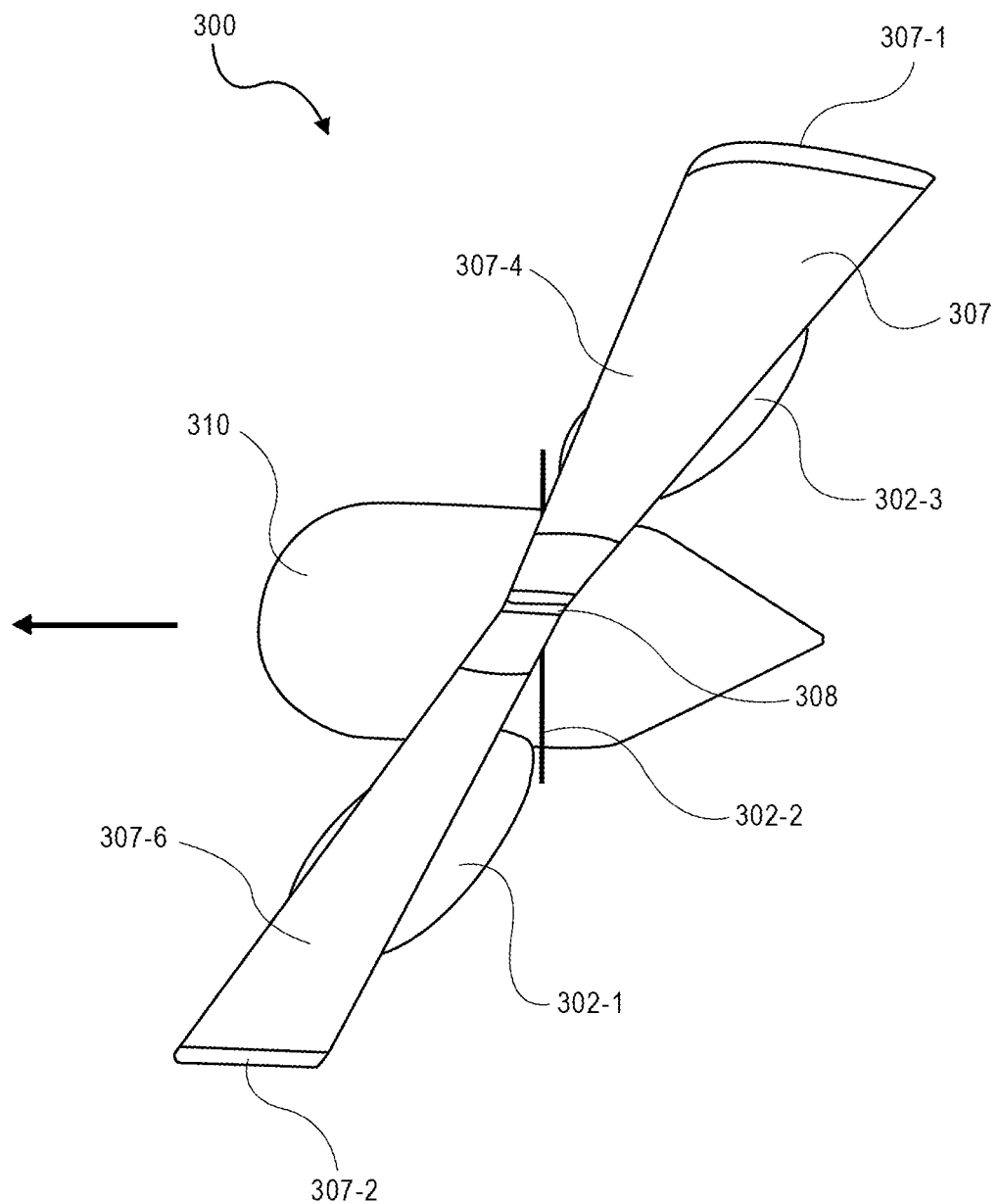

FIG. 3 is a side view of an aerial vehicle 300 with a ring wing 307, in accordance with disclosed implementations. The aerial vehicle 300 corresponds to the aerial vehicle 100 discussed in FIG. 1 and aerial vehicle 200 discussed in FIG. 2. As illustrated, when the aerial vehicle is oriented for horizontal flight, as illustrated in FIG. 3, the fuselage 310 is oriented horizontally and two of the propulsion mechanisms, propulsion mechanism 302-2 and the propulsion mechanism on the opposing side of the fuselage and illustrated in FIG. 1, are oriented to produce thrust in a substantially horizontal direction. In comparison, the other propulsion mechanisms, such as propulsion mechanisms 302-1 and 302-3, are not oriented to produce forces in substantially the horizontal direction. During horizontal flight, the propulsion mechanisms, such as propulsion mechanism 302-1 and 302-3, may be disabled and/or used to produce maneuverability forces that will cause the aerial vehicle to pitch, yaw, and/or roll as it aerially navigates in a substantially horizontal direction. In some implementations, the propulsion mechanisms that are not aligned to produce substantially horizontal forces may be allowed to freely rotate in the wind and energy produced from the rotation may be used to charge the power module of the aerial vehicle 300.

The ring wing 307 is angled such that the lower segment 307-2 of the ring wing is positioned ahead of the upper segment 307-1 of the ring wing 307. The leading wing, lower segment 307-2 produces a much higher lift per square inch than the rear wing, upper segment 307-1, and the chord length of the lower segment 307-2 is less than the chord length of the upper segment 307-1. Likewise, as illustrated, the upper segment 307-1 of the ring wing has a different camber than the lower segment 307-2. The chord length and camber transition from that illustrated along the upper segment 307-1 to the lower segment 307-2. In implementations that include one or more stabilizer fins, such as stabilizer fin 120 (FIG. 1), the difference between the chord lengths of the lower segment 307-2 and the upper segment 307-1 may be less and/or the difference between the cambers of the lower segment 307-2 and the upper segment 307-1 may be less.

While the side segments, such as side segment 307-4 and segment 307-6 of the ring wing provide some lift, at the midpoint 308 of each side segment there is minimal lift produced by the ring wing 307. Because there is minimal lift produced at the midpoint 308, the segments may be tapered to reduce the overall weight of the aerial vehicle. In this example, the side segments, such as side segments 307-4 and 307-6, are tapered toward the mid-point but retain some dimension for structural integrity and to operate as a protective barrier around the propulsion mechanisms 302. While the illustrated examples show both side segments 307-4 and 307-6 tapering to a smaller end at the midpoint 308, in other implementations, the taper may be consistent from the larger top segment 307-1 to the smaller lower segment 307-2.

In addition to providing lift, the ring wing 307 provides a protective barrier or shroud that surrounds the propulsion mechanisms of the aerial vehicle 300. The protective barrier of the ring wing 307 increases the safety of the aerial vehicle. For example, if the aerial vehicle comes into contact with another object, there is a higher probability that the object will contact the ring wing, rather than a propulsion mechanism.

Figure 4:
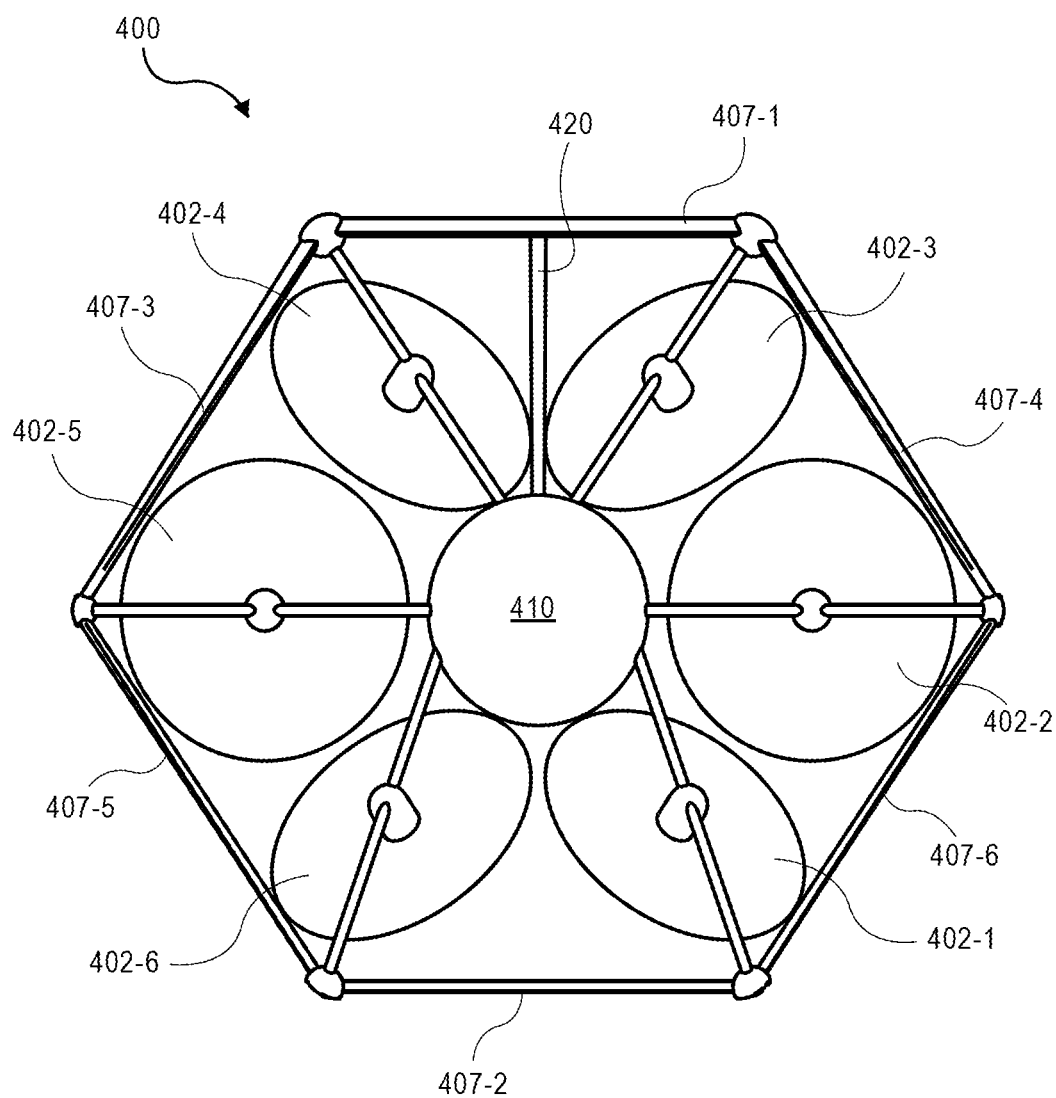

FIG. 4 is a front-on view of an aerial vehicle 400 with a ring wing 407 having a substantially hexagonal shape, according to disclosed implementations. The aerial vehicle 400 corresponds to aerial vehicle 100 of FIG. 1, aerial vehicle 200 of FIG. 2, and aerial vehicle 300 of FIG. 3. As discussed above with respect to FIG. 3, when the aerial vehicle is oriented for horizontal flight, as illustrated in FIGS. 3 and 4, the fuselage 410 is oriented in the direction of travel, the ring wing 407 is oriented in the direction of travel such that it will produce a lifting force, and propulsion mechanisms 402-2 and 402-5, which are on opposing sides of the fuselage 410, are aligned to produce forces in the substantially horizontal direction to propel or thrust the aerial vehicle horizontally. The other propulsion mechanisms 402-1, 402-3, 402-4, and 402-6 are offset and may be disabled, used to produce maneuverability forces, and/or allowed to freely rotate and produce energy that is used to charge a power module of the aerial vehicle 400. By increasing the thrust produced by each of the propulsion mechanisms 402-2 and 402-5, the horizontal speed of the aerial vehicle increases. Likewise, the lifting force from the ring wing 407 also increases. In some implementations, one or more ailerons, such as those discussed above with respect to FIG. 1, may be included on the surface of the ring wing and used to control the aerial navigation of the aerial vehicle during horizontal flight. Likewise, one or more stabilizer fins 420 may be included to stabilize the aerial vehicle during horizontal flight.

Figure 5:
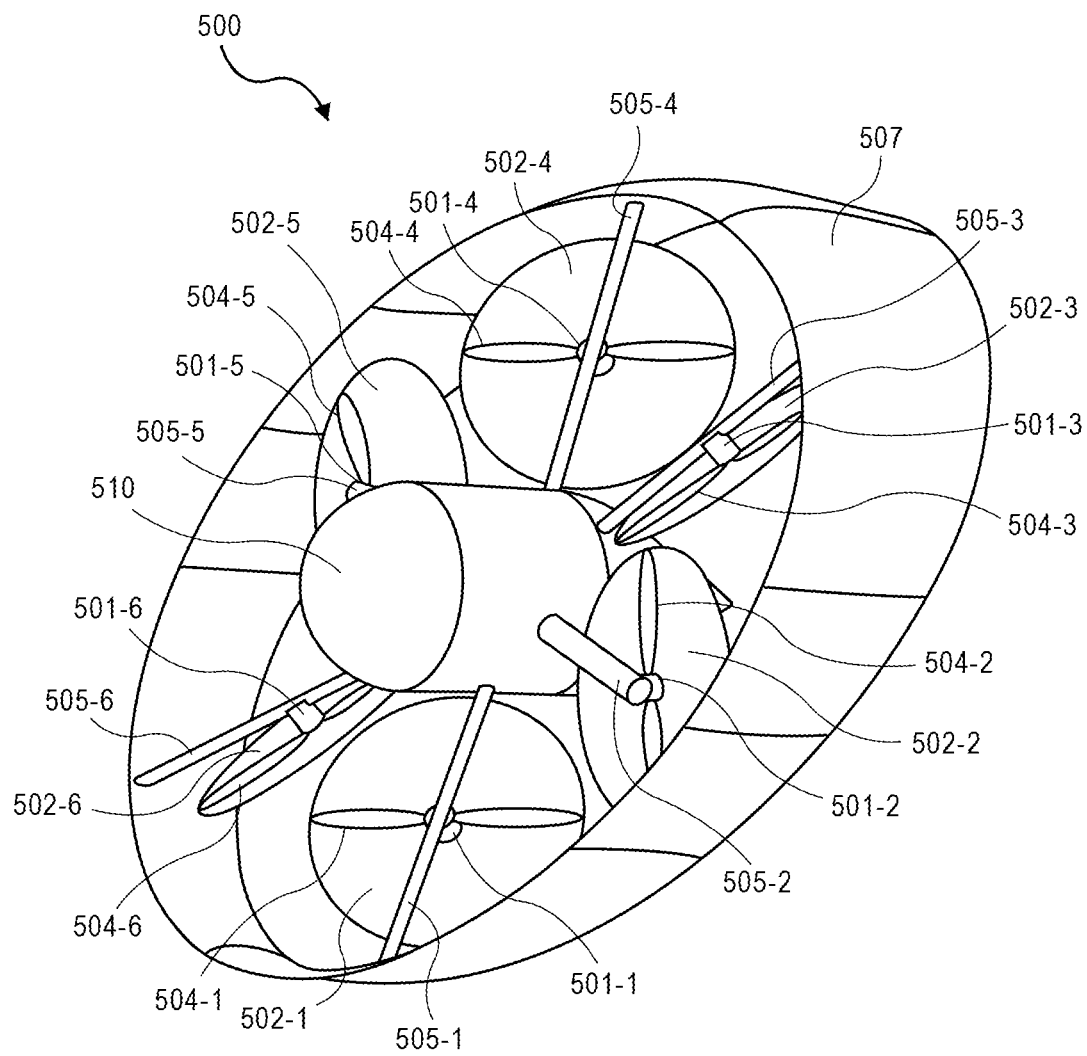
FIG. 5 illustrates a view of an aerial vehicle with a substantially circular shaped ring wing, in accordance with disclosed implementations.

In some implementations, the hexagonal shaped ring wing may decrease manufacturing costs, provide for more stable flight, and provide flatter surfaces upon which control elements, such as ailerons, may be included, in comparison to a substantially circular shaped ring wing as described herein with respect to FIG. 5. Likewise, other components may be coupled to the surface of the ring wing. Other components include, but are not limited to, sensors, imaging elements, range finders, identifying markers, navigation components, such as global positioning satellite antennas, antennas, etc.

As discussed below, to transition the aerial vehicle from a VTOL orientation, as illustrated in FIG. 2, to a horizontal flight orientation, as illustrated in FIGS. 3 and 4, forces generated by each of the propulsion mechanisms 402 will cause the aerial vehicle to pitch forward and increase in speed in the horizontal direction. As the horizontal speed increases and the pitch increases, the lifting force produced by the airfoil shape of the ring wing will increase which will further cause the aerial vehicle to pitch into the horizontal flight orientation and allow the aerial vehicle to remain airborne.

In contrast, as discussed below, when the aerial vehicle is to transition from a horizontal flight orientation to a VTOL orientation, forces from the propulsion mechanisms may cause the aerial vehicle to decrease pitch and reduce horizontal speed. As the pitch of the aerial vehicle decreases, the lift produced by the airfoil shape of the ring wing decreases and the thrust produced by each of the six propulsion mechanisms 402 are utilized to maintain flight of the aerial vehicle 400.

As illustrated in FIGS. 1-4, each of the propulsion mechanisms 402 are positioned in approximately the same plane that is substantially aligned with the ring wing. Likewise, each propulsion mechanism 402 is spaced approximately sixty degrees from each other around the fuselage 410, such that the propulsion mechanisms are positioned at approximately equal distances with respect to one another and around the fuselage 410 of the aerial vehicle 400. For example, the second propulsion mechanism 402-2 and the fifth propulsion mechanism 402-5 may each be positioned along the X axis. The third propulsion mechanism 402-3 may be positioned at approximately sixty degrees from the X axis and the fourth propulsion mechanism 402-4 may be positioned approximately one-hundred and twenty degrees from the X axis. Likewise, the first propulsion mechanism 402-1 and the sixth propulsion mechanism 402-6 may likewise be positioned approximately sixty and one-hundred and twenty degrees from the X axis in the negative direction.

In other implementations, the spacing between the propulsion mechanisms may be different. For example, propulsion mechanisms 402-1, 402-3, and 402-5, which are oriented in the first direction, may each be approximately equally spaced 120 degrees apart and propulsion mechanisms 402-2, 402-4, and 402-6, which are oriented in the second direction, may also be approximately equally spaced 120 degrees apart. However, the spacing between propulsion mechanisms oriented in the first direction and propulsion mechanisms oriented in the second direction may not be equal. For example, the propulsion mechanisms 402-1, 402-3, and 402-5, oriented in the first direction, may be positioned at approximately zero degrees, approximately 120 degrees, and approximately 240 degrees around the perimeter of the aerial vehicle with respect to the X axis, and the propulsion mechanisms 402-2, 402-4, and 402-6, oriented in the second direction, may be positioned at approximately 10 degrees, approximately 130 degrees, and approximately 250 degrees around the perimeter of the aerial vehicle 400 with respect to the X axis.

In other implementations, the propulsion mechanisms may have other alignments. Likewise, in other implementations, there may be fewer or additional propulsion mechanisms. Likewise, in some implementations, the propulsion mechanisms may not all be aligned in the same plane and/or the ring wing may be in a different plane than some or all of the propulsion mechanisms.

While the examples discussed above and illustrated in FIGS. 1-4 discuss rotating the propulsion mechanisms approximately thirty degrees about each respective motor arm and that the ring wing is offset approximately thirty degrees with respect to the fuselage, in other implementations, the orientation of the propulsion mechanisms and/or the ring wing may be greater or less than thirty degrees and the angle of the ring wing may be different than the angle of one or more propulsion mechanisms. In some implementations, if maneuverability of the aerial vehicle when the aerial vehicle is in VTOL orientation is of higher importance, the orientation of the propulsion mechanisms may be higher than thirty degrees. For example, each of the propulsion mechanisms may be oriented approximately forty-five degrees about each respective motor arm, in either the first or second direction. In comparison, if the lifting force of the aerial vehicle when the aerial vehicle is in the VTOL orientation is of higher importance, the orientation of the propulsion mechanisms may be less than thirty degrees. For example, each propulsion mechanism may be oriented approximately ten degrees from a vertical orientation about each respective motor arm.

In some implementations, the orientations of some propulsion mechanisms may be different than other propulsion mechanisms. For example, propulsion mechanisms 402-1, 402-3, and 402-5 may each be oriented approximately fifteen degrees in the first direction and propulsion mechanisms 402-2, 402-4, and 402-6 may be oriented approximately twenty-five degrees in the second direction. In still other examples, pairs of propulsion mechanisms may have different orientations than other pairs of propulsion mechanisms. For example, propulsion mechanisms 402-1 and 402-6 may each be oriented approximately thirty degrees in the first direction and second direction, respectively, toward one another, propulsion mechanisms 402-3 and 402-2 may each be oriented approximately forty-five degrees in the first direction and second direction, respectively, toward one another, and propulsion mechanisms 402-5 and 402-4 may each be oriented approximately forty-five degrees in the first direction and second direction, respectively, toward one another.

As discussed below, by orienting propulsion mechanisms partially toward one another in pairs, as illustrated, the lateral or horizontal forces generated by the pairs of propulsion mechanisms, when producing the same amount of force, will cancel out such that the sum of the forces from the pair is only in a substantially vertical direction (Z direction), when the aerial vehicle is in the VTOL orientation. Likewise, as discussed below, if one propulsion mechanism of the pair produces a force larger than a second propulsion mechanism, a lateral or horizontal force will result in the X direction and/or the Y direction, when the aerial vehicle is in the VTOL orientation. A horizontal force produced from one or more of the pairs of propulsion mechanisms enables the aerial vehicle to translate in a horizontal direction and/or yaw without altering the pitch of the aerial vehicle, when the aerial vehicle is in the VTOL orientation. Producing lateral forces by multiple pairs of propulsion mechanisms 402 enables the aerial vehicle 400 to operate independently in any of the six degrees of freedom (surge, sway, heave, pitch, yaw, and roll). As a result, the stability and maneuverability of the aerial vehicle 400 is increased.

While the implementations illustrated in FIGS. 1-4 include six arms that extend radially from a central portion of the aerial vehicle and are coupled to the ring wing, in other implementations, there may be fewer or additional arms. For example, the aerial vehicle may include support arms that extend between the motor arms and provide additional support to the aerial vehicle. As another example, not all of the motor arms may extend to and couple with the ring wing.

FIG. 5 illustrates a view of an aerial vehicle 500 with a ring wing that is substantially cylindrical or circular in shape and that surrounds a plurality of propulsion mechanisms, in accordance with disclosed implementations. The aerial vehicle 500 includes six motors 501-1, 501-2, 501-3, 501-4, 501-5, and 501-6 and corresponding propellers 504-1, 504-2, 504-3, 504-4, 504-5, and 504-6 spaced about the fuselage 510 of the aerial vehicle 500. The propellers 504 may be any form of propeller (e.g., graphite, carbon fiber) and of any size. For example, the propellers may be 10 inch-12-inch diameter carbon fiber propellers.

The form and/or size of some of the propellers may be different than other propellers. Likewise, the motors 501 may be any form of motor, such as a DC brushless motor, and may be of a size sufficient to rotate the corresponding propeller. Likewise, in some implementations, the size and/or type of some of the motors 501 may be different than other motors 501. In some implementations, the motors may be rotated in either direction such that the force generated by the propellers may be either a positive force, when rotating in a first direction, or a negative force, when rotating in the second direction. Alternatively, or in addition thereto, the pitch of the blades of a propeller may be variable. By varying the pitch of the blades, the force generated by the propeller may be altered to either be in a positive direction or a negative direction. Still further, in some implementations, the pitch of the blades may be adjusted such that they are aligned with the direction of travel of the aerial vehicle and thus provide significantly less drag if they are not rotating.

Each pair of motors 501 and corresponding propellers 504 will be referred to herein collectively as a propulsion mechanism 502, such as propulsion mechanisms 502-1, 502-2, 502-3, 502-4, 502-5, and 502-6. Likewise, while the example illustrated in FIG. 5 describes the propulsion mechanisms 502 as including motors 501 and propellers 504, in other implementations, other forms of propulsion may be utilized as the propulsion mechanisms 502. For example, one or more of the propulsion mechanisms 502 of the aerial vehicle 500 may utilize fans, jets, turbojets, turbo fans, jet engines, and/or the like to maneuver the aerial vehicle. Generally described, a propulsion mechanism 502, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 502-1, 502-2, 502-3, 502-4, 502-5, and 502-6) may be configured such that their individual orientations may be dynamically modified (e.g., change from vertical to horizontal flight orientation or any position therebetween).

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

The aerial vehicle 500 also includes a ring wing 507 having a substantially cylindrical or circular shape that extends around and forms the perimeter of the aerial vehicle 500. In the illustrated example, the ring wing is substantially circular in shape and tapers toward the bottom of the aerial vehicle. The ring wing 507 has an airfoil shape to produce lift when the aerial vehicle is oriented as illustrated in FIG. 5 and moving in a direction that is substantially horizontal. As illustrated, and discussed further below, the ring wing is positioned at an angle with respect to the fuselage 510 such that the lower part of the ring wing acts as a front wing as it is positioned toward the front of the aerial vehicle when oriented as shown and moving in a horizontal direction. The top of the ring wing, which has a longer chord length than the bottom portion of the ring wing 507, is positioned farther back and thus acts as a rear wing.

The ring wing is secured to the fuselage 510 by motor arms 505. In the illustrated example, each of motors arms 505-1, 505-3, 505-4, and 505-6 are coupled to the fuselage 510 at one end, extend from the fuselage 510 and couple to the ring wing 507 at a second end, thereby securing the ring wing 507 to the fuselage 510.

The fuselage 510, motor arms 505, and ring wing 507 of the aerial vehicle 500 may be formed of any one or more suitable materials, such as graphite, carbon fiber, and/or aluminum.

Each of the propulsion mechanisms 502 are coupled to a respective motor arm 505 (or propulsion mechanism arm) such that the propulsion mechanism 502 is substantially contained within the perimeter of the ring wing 507. For example, propulsion mechanism 502-1 is coupled to motor arm 505-1, propulsion mechanism 502-2 is coupled to motor arm 505-2, propulsion mechanism 502-3 is coupled to motor arm 505-3, propulsion mechanism 502-4 is coupled to motor arm 505-4, propulsion mechanism 502-5 is coupled to motor arm 505-5, and propulsion mechanism 502-6 is coupled to motor arm 505-6. In the illustrated example, propulsion mechanisms 502-1, 502-3, 502-4, and 502-6 are coupled at an approximate mid-point of the respective motor arm 505 between the fuselage 510 and the ring wing 507. In other implementations, the propulsion mechanisms (such as propulsion mechanisms 502-2 and 502-5 illustrated in FIG. 5) may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 510 or closer toward the ring wing 507).

As illustrated, the propulsion mechanisms 502 may be oriented at different angles with respect to each other. For example, propulsion mechanisms 502-2 and 502-5 are aligned with the fuselage 510 such that the force generated by each of propulsion mechanisms 502-2 and 502-5 is in-line or in the same direction or orientation as the fuselage. In the illustrated example, the aerial vehicle 500 is oriented for horizontal flight such that the fuselage is oriented horizontally in the direction of travel. In such an orientation, the propulsion mechanisms 502-2 and 502-5 provide horizontal forces, also referred to herein as thrusting forces, and act as thrusting propulsion mechanisms.

In comparison to propulsion mechanisms 502-2 and 502-5, each of propulsion mechanisms 502-1, 502-3, 502-4, and 502-6 are offset or angled with respect to the orientation of the fuselage 510. When the aerial vehicle 500 is oriented horizontally as shown in FIG. 5 for horizontal flight, the propulsion mechanisms 502-1, 502-3, 502-4, and 502-6 may be used as propulsion mechanisms, providing thrust in a non-horizontal direction to cause the aerial vehicle to pitch, yaw, roll, heave and/or sway. In other implementations, during horizontal flight, the propulsion mechanisms 502-1, 502-3, 502-4, and 502-6 may be disabled such that they do not produce any forces and the aerial vehicle 500 may be propelled aerially in a horizontal direction as a result of the lifting force from the aerodynamic shape of the ring wing 507 and the horizontal thrust produced by the thrusting propulsion mechanisms 502-2 and 502-5.

The angle of orientation of each of the propulsion mechanisms 502-1, 502-3, 502-4, and 502-6 may vary for different implementations. Likewise, in some implementations, the offset of the propulsion mechanisms 502-1, 502-3, 502-4, and 502-6 may each be the same, with some oriented in one direction and some oriented in another direction, may each be oriented different amounts, and/or in different directions.

In the illustrated example of FIG. 5, each propulsion mechanism 502-1, 502-2, 502-3, 502-4, 502-5, and 502-6 may be oriented approximately thirty degrees with respect to the position of each respective motor arm 505-1, 505-2, 505-3, 505-4, 505-5, and 505-6. In addition, the direction of orientation of the propulsion mechanisms is such that pairs of propulsion mechanisms are oriented toward one another. For example, propulsion mechanism 502-1 is oriented approximately thirty degrees toward propulsion mechanism 502-6. Likewise, propulsion mechanism 502-2 is oriented approximately thirty degrees in a second direction about the second motor arm 505-2 and oriented toward propulsion mechanism 502-3. Finally, propulsion mechanism 502-4 is oriented approximately thirty degrees in the first direction about the fourth motor arm 505-4 and toward propulsion mechanism 502-5. As illustrated, propulsion mechanisms 502-2 and 502-5, which are on opposing sides of the fuselage 110, are aligned and oriented in a same first direction (in this example, horizontal). Propulsion mechanisms 502-3 and 502-6, which are on opposing sides of the fuselage 510, are aligned and oriented in a same second direction, which is angled compared to the first direction. Propulsion mechanisms 502-1 and 502-4, which are on opposing sides of the fuselage 510, are aligned and oriented in a same third direction, which is angled compared to the first direction and the second direction.

Various other features, variations, modifications, and/or example embodiments described herein with respect to FIGS. 1-4 may also be combined and/or incorporated into the aerial vehicle 500 as illustrated in FIG. 5.

While the examples discussed above in FIGS. 1-5 describe a ring wing in either a substantially hexagonal shape (FIGS. 1-4) or a substantially circular shape (FIG. 5), in other implementations, the ring wing may have other shapes. For example, the ring wing may be substantially square, rectangular, pentagonal, octagonal, etc. Further, while the examples discussed above include six propulsion mechanism arms, six propulsion mechanisms, and six propellers, in other example embodiments, the aerial vehicle reconfigurations described herein may be implemented on various other types of aerial vehicles, such as aerial vehicles having fewer than six propulsion mechanism arms, motors, and propellers, aerial vehicles having greater than six propulsion mechanism arms, motors, and propellers, and/or aerial vehicles having configurations different from those described herein, such as quad-copters, octa-copters, or other configurations.

During operation of example aerial vehicles, such as those illustrated and described with respect to FIGS. 1-5, various types of faults or failure modes may arise that result in degraded operational states of the aerial vehicles. For example, one or more of the propulsion mechanisms may no longer operate normally due to various types of faults, which may be referred to as motor out situations. In order to improve the reliability, safety, and operational capability of the aerial vehicles, the aerial vehicles may implement one or more reconfigurations in response to such faults in order to maintain flight of the aerial vehicles and land at safe landing locations.

The various types of faults that may result in motor out situations may include damage or loss of function of one or more propellers or propeller blades, damage or loss of function of one or more motors, damage or loss of function of one or more motor controllers that are each in communication with a corresponding motor and propeller, damage or loss of function between one or more motor controllers and a flight controller that is in communication with each of the motor controllers, loss of power or other electrical signals between two or more components of the aerial vehicle, or various other types of faults.

In addition, the various types of faults may be detected in various manners. For example, damage or loss of function of one or more propellers or propeller blades may be detected by comparison of actual values of motor revolutions per minute (rpm) and applied current with expected values of motor rpm and applied current, since a motor rotating with damaged or missing propellers or blades may draw different values of current than expected values while rotating at a particular motor rpm. In addition, damage or loss of function of one or more motors may be detected by comparison of measured rpm versus commanded rpm, or by measurements and/or calculations related to motor efficiency. Further, various faults of one or more propellers, blades, and/or motors may be detected by one or more motor controllers, which may be provided as feedback to the flight controller. Moreover, various faults of one or more motor controllers may be detected by the flight controller.

In further example embodiments, various other types of sensors may be used to detect one or more of the various types of faults that result in motor out situations. For example, the sensors may include imaging devices or cameras that can capture images of portions of propellers, blades, and/or motors, which images may be processed to determine damage or loss of function of one or more components. In addition, the sensors may include inertial measurement units, accelerometers, gyroscopes, or similar types of sensors that may detect changes to flight operations or navigation of the aerial vehicle that may be caused by one or more faults that result in motor out situations. Various other types of sensors may also detect aspects of flight, navigation, movement, or operation of various components of the aerial vehicles to identify one or more faults. Moreover, the various types of faults may be detected by various combinations of methods described herein.

Figure 6A:
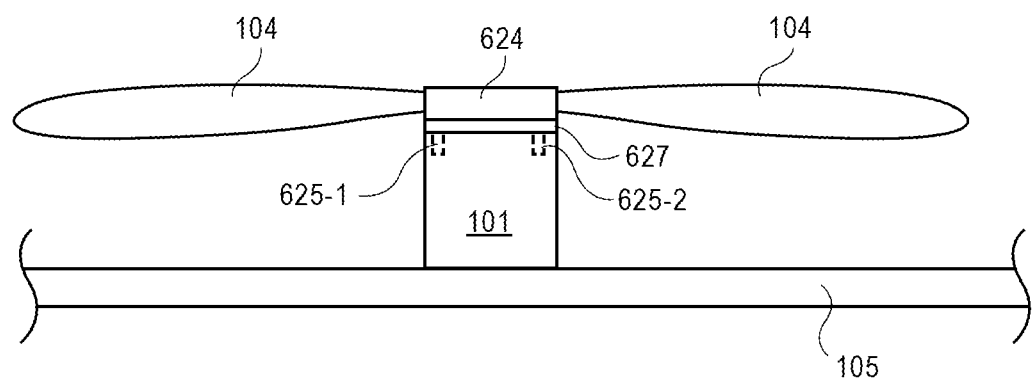
FIGS. 6A and 6B illustrate views of a propeller of a propulsion mechanism having an adjustable orientation, in accordance with disclosed implementations.
Figure 6B:
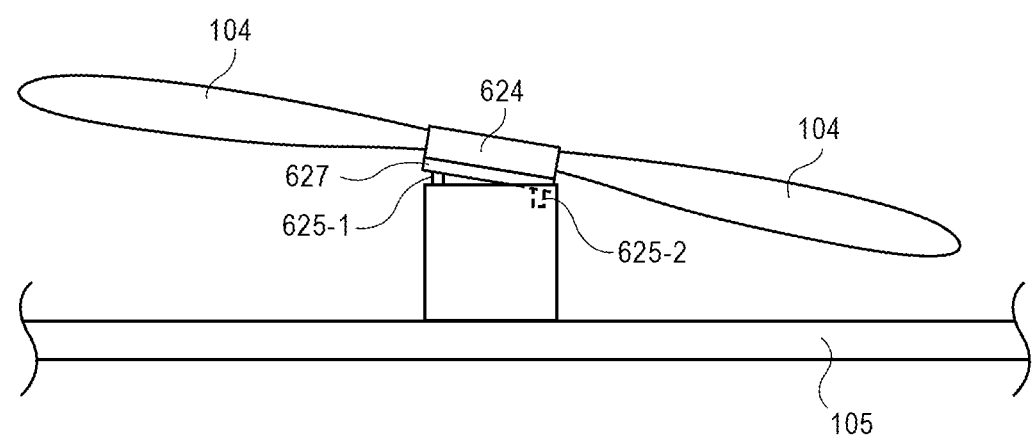

FIGS. 6A and 6B illustrate views of a propeller 104 of a propulsion mechanism having an adjustable orientation, in accordance with disclosed implementations.

As shown in FIG. 6A, the propeller (or propeller blades) 104 may be coupled to a propeller hub 624 that is coupled to and rotated by a motor 101. In addition, the propeller hub 624 may be connected to a shaft or rotating part (not shown) of the motor 101 via a ball joint or other pivotable connection. The motor 101 may also be mounted or coupled to a motor arm 105. In example embodiments, a propeller cam 627 may be positioned between the motor 101 and the propeller hub 624. The propeller cam 627 may be associated with the motor 101, and may include an interfacing surface, track, and/or bearing along which the propeller hub 624 rotates. One or more actuators 625 may be associated with the motor 101 and/or the propeller cam 627, and may be operable to alter an orientation of the propeller cam 627 relative to the motor 101. Each of the actuators 625 may be connected via electrical lines or wirelessly (not shown) to an aerial vehicle control system, a part thereof, or another component in communication with the aerial vehicle control system, in order to receive power and/or instructions or commands. Although FIG. 6A shows two actuators 625-1 and 625-2 associated with the motor 101 and/or the propeller cam 627, other numbers or arrangements of actuators may also be mounted or coupled between the motor 101 and the propeller cam 627.

The actuators 625 may include one or more of a clutch, a switch, a bias element or spring, a damper, a spring-loaded actuator, a servo, a solenoid, a motor, a screw actuator, a geared actuator, a magnetic actuator, a linear actuator, a rotary actuator, a piezoelectric actuator, or various other types of actuators. In addition, the actuators 625 may be configured for one-time actuation, e.g., upon detection of a propulsion mechanism failure or other aerial vehicle fault or failure, may be configured for one-way or two-way actuation, may be configured for binary actuation between two different positions, and/or may be configured for variable actuation between a plurality of different positions.

As shown in FIG. 6A, the actuators 625 may include a clutch, a switch, or a spring-loaded actuator that moves the propeller cam 627 relative to the motor 101 between two or more angular orientations. In addition, the actuators 625 may include a servo or a magnetic actuator that moves the propeller cam 627 relative to the motor 101 between two or more angular orientations. Further, the actuators 625 may include a solenoid and a bias element that move the propeller cam 627 relative to the motor 101 between two or more angular orientations. Moreover, the actuators 625 may include a motor, a rotary actuator, a screw actuator, or a geared actuator that moves the propeller cam 627 relative to the motor 101 between two or more angular orientations. Various other actuators or combinations of actuators may be used to effect movement, pivoting, or rotation of the propeller cam 627 relative to the motor 101.

As shown in the example illustrated embodiment in FIG. 6B, upon actuation of one actuator 625-1, the propeller cam 627 may change its angular orientation, e.g., rotate or pivot as a result of the extended actuator 625-1. Because the propeller hub 624 interfaces with a surface, track, or bearing of the propeller cam 627, the propeller hub 624 may also change its angular orientation in a manner similar to the propeller cam 627. As a result, the angular orientation of the propeller 104 may be changed by actuation of the propeller cam 627, such that a direction of thrust generated by the propeller 104 and motor 101 may be correspondingly modified.

Moreover, although FIGS. 6A and 6B describe a propeller cam that may alter an angular orientation of a propeller hub relative to a motor, other physical mechanisms may be utilized in place of or in addition to the propeller cam. For example, one or more bars or linkages and associated actuators may be coupled to a propeller hub and used to change an angular orientation of the propeller hub relative to a motor. In addition, a shaft of the motor may include a ball joint or other pivotable connection between the motor and the propeller hub, and one or more actuators, bars, or linkages and associated actuators may modify the angular orientation of the ball joint or other pivotable connection to change the angular orientation of the propeller hub and propeller. Various other physical mechanisms may also be used to modify the angular orientation of the propeller hub relative to the motor.

In further example embodiments, the one or more actuators 625 associated with the motor 101 and/or the propeller cam 627 may have variable elasticity. One or more of the actuators 625 may be configured to modify the position and/or orientation of the propeller cam 627 relative to the motor 101, such that the propeller cam 627 may move or pivot relative to the motor 101. Other numbers or arrangements of actuators having variable elasticity may also be mounted or coupled between the motor 101 and the propeller cam 627.

In the further example embodiments, the actuators 625 may include one or more of a tunable or variable bias element or spring, a magnetic actuator, a piezoelectric actuator, a solenoid, a linear actuator, or other types of actuators that may permit active or passive control of elasticity or springiness. In addition, the actuators 625 may be configured for one-time actuation, e.g., upon detection of a propulsion mechanism failure or other aerial vehicle fault or failure, may be configured for one-way or two-way actuation, may be configured for binary actuation between two different levels of elasticity or springiness, and/or may be configured for variable actuation between a plurality of different levels of elasticity or springiness.

For example, in the further example embodiment with respect to FIG. 6B, the actuators 625 having variable elasticity may include a tunable or variable bias element or spring, or a magnetic actuator, that may be controlled to change its elasticity or springiness. In response to altering the elasticity or springiness of one or more actuators 625, a direction of thrust generated by the propeller 104 and motor 101 may be dependent upon a magnitude of thrust generated by the propeller 104 and motor 101 and the modified elasticity of the one or more actuators 625. In the further example embodiment of FIG. 6B, if the actuator 625-1 is modified to have greater elasticity than actuator 625-2, the direction of thrust generated by the propeller 104 and motor 101 may rotate or pivot as actuator 625-1 extends or lengthens due to its greater elasticity, dependent upon the magnitude of thrust generated by the propeller 104 and motor 101. Likewise, if the actuator 625-2 is modified to have greater elasticity than actuator 625-1, the direction of thrust generated by the propeller 104 and motor 101 may rotate or pivot as actuator 625-2 extends or lengthens due to its greater elasticity, dependent upon the magnitude of thrust generated by the propeller 104 and motor 101. Thus, a greater magnitude of thrust generated by a propeller and motor combined with a change in elasticity of one or more actuators may result in a greater change in a direction of thrust of the propeller and motor.

Figure 7A:
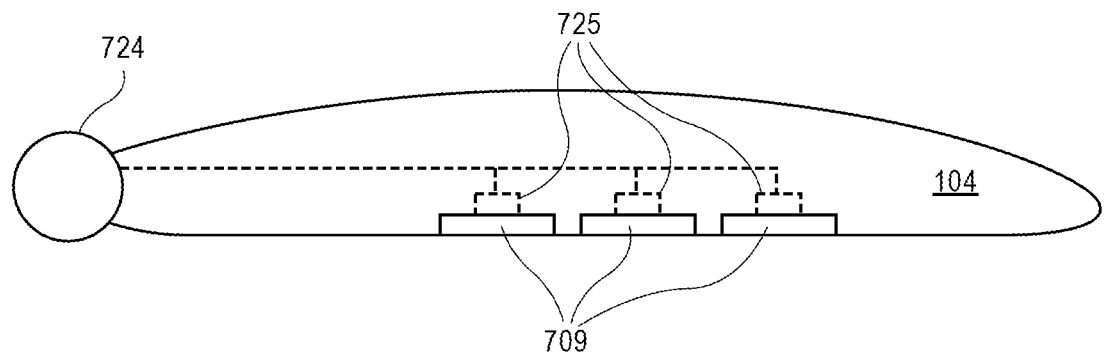
FIG. 7A illustrates a view of a propeller blade of a propulsion mechanism having adjustable control surfaces and/or trim tabs, in accordance with disclosed implementations.

FIG. 7A illustrates a view of a propeller blade 104 of a propulsion mechanism having adjustable control surfaces and/or trim tabs 709, in accordance with disclosed implementations.

As shown in FIG. 7A, the propeller blade 104 extending from propeller hub 724 may include one or more control surfaces and/or trim tabs 709 that are movably or pivotably connected to the propeller blade 104. For example, the propeller blade 104 may include three control surfaces or trim tabs 709 along a trailing edge of the blade 104. Each of the control surfaces or trim tabs 709 may be associated with one or more actuators 725, and each of the actuators 725 may be connected via electrical lines or wirelessly (shown as dashed lines) to an aerial vehicle control system, a part thereof, or another component in communication with the aerial vehicle control system, in order to receive power and/or instructions or commands. Although FIG. 7A shows three control surfaces or trim tabs in a particular arrangement and orientation, other numbers, arrangements, or orientations of control surfaces and/or trim tabs may be included on the propeller blade 104. In addition, although FIG. 7A shows each control surface or trim tab 709 associated with a respective actuator 725, other numbers or arrangements of control surfaces or trim tabs and associated actuators may be included on the propeller blade 104. For example, one actuator 725 may control actuation of all control surfaces or trim tabs 709 of a propeller blade 104.

The actuators 725 may include one or more of a clutch, a switch, a bias element or spring, a damper, a spring-loaded actuator, a servo, a solenoid, a motor, a screw actuator, a geared actuator, a magnetic actuator, a linear actuator, a rotary actuator, a piezoelectric actuator, or various other types of actuators. In addition, the actuators 725 may be configured for one-time actuation, e.g., upon detection of a propulsion mechanism failure or other aerial vehicle fault or failure, may be configured for one-way or two-way actuation, may be configured for binary actuation between two different positions, and/or may be configured for variable actuation between a plurality of different positions.

As shown in FIG. 7A, the actuators 725 may include a clutch, a switch, or a spring-loaded actuator that moves the control surfaces or trim tabs 709 relative to the blade 104 between two or more angular orientations. In addition, the actuators 725 may include a servo or a magnetic actuator that moves the control surfaces or trim tabs 709 relative to the blade 104 between two or more angular orientations. Further, the actuators 725 may include a solenoid and a bias element that move the control surfaces or trim tabs 709 relative to the blade 104 between two or more angular orientations. Moreover, the actuators 725 may include a motor, a rotary actuator, a linear actuator, a screw actuator, or a geared actuator (such as a rack and pinion) that moves the control surfaces or trim tabs 709 relative to the blade 104 between two or more angular orientations. Various other actuators or combinations of actuators may be used to effect movement or rotation of the control surfaces or trim tabs 709 relative to the blade 104.

Figure 7B:
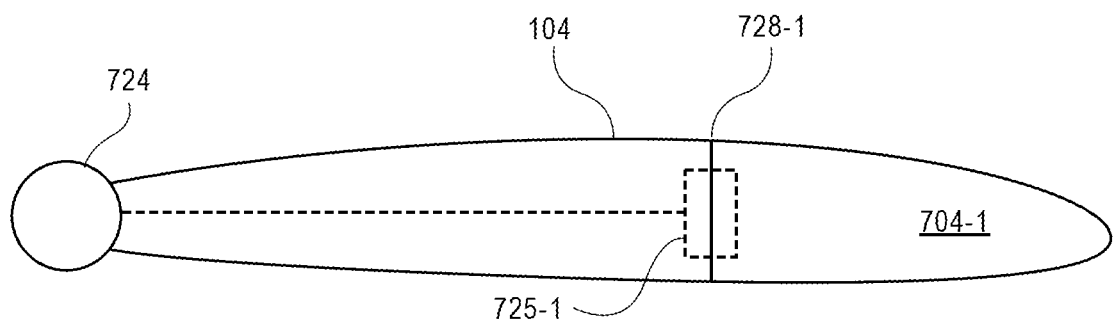
FIG. 7B illustrates a view of a propeller blade of a propulsion mechanism having an adjustable blade section using variable elasticity, in accordance with disclosed implementations.

FIG. 7B illustrates a view of a propeller blade 104 of a propulsion mechanism having an adjustable blade section 704-1 using variable elasticity, in accordance with disclosed implementations.

As shown in FIG. 7B, the propeller blade 104 extending from propeller hub 724 may include an adjustable blade section 704-1, e.g., a tip section, that is movably or pivotably connected to the propeller blade 104 at a hinge or pivotable connection 728-1. For example, an actuator 725-1 may be coupled between the blade section 704-1 and the blade 104 at or around the pivotable connection 728-1, and the actuator 725-1 may be connected via electrical lines or wirelessly (shown as dashed lines) to an aerial vehicle control system, a part thereof, or another component in communication with the aerial vehicle control system, in order to receive power and/or instructions or commands. Further, the actuator 725-1 associated with the pivotable connection 728-1 and/or the blade section 704-1 may have variable elasticity. The actuator 725-1 may be configured to modify the angular orientation of the blade section 704-1 relative to the blade 104, such that the blade section 704-1 may rotate or pivot upward and/or downward relative to a plane of the blade 104, e.g., similar to a dihedral or anhedral angle. Other numbers or arrangements of actuators having variable elasticity may also be mounted or coupled between the blade section 704-1 and blade 104.

The actuator 725-1 may include one or more of a tunable or variable bias element or spring, a magnetic actuator, a piezoelectric actuator, a solenoid, a linear actuator, or other types of actuators that may permit active or passive control of elasticity or springiness. In addition, the actuator 725-1 may be configured for one-time actuation, e.g., upon detection of a propulsion mechanism failure or other aerial vehicle fault or failure, may be configured for one-way or two-way actuation, may be configured for binary actuation between two different levels of elasticity or springiness, and/or may be configured for variable actuation between a plurality of different levels of elasticity or springiness.

For example, as shown in FIG. 7B, the actuator 725-1 having variable elasticity may include a tunable or variable bias element or spring, or a magnetic actuator, that may be controlled to change its elasticity or springiness. In response to altering the elasticity or springiness of the actuator 725-1, a direction of thrust generated by the propeller 104 and associated motor may be modified and/or may be dependent upon a magnitude of thrust generated by the propeller 104 and associated motor and the modified elasticity of the actuator 725-1. In the further example embodiment of FIG. 7B, if the actuator 725-1 is modified to have greater elasticity during a first arc of travel of the blade section 704-1 during a single revolution and is modified to have lesser elasticity during a second arc of travel of the blade section 704-1 during the single revolution, the direction of thrust generated by the propeller 104 and associated motor may be modified due to the differential elasticity of the actuator 725-1 during the single revolution, which may also be dependent upon the magnitude of thrust generated by the propeller 104 and associated motor. In addition, a greater magnitude of thrust generated by a propeller and motor combined with a change in elasticity of one or more actuators may result in a greater change in a direction of thrust of the propeller and motor.

FIGS. 8A-8D illustrate views of a propeller blade 104 of a propulsion mechanism having an adjustable orientation and/or adjustable length, in accordance with disclosed implementations.

Figure 8A:
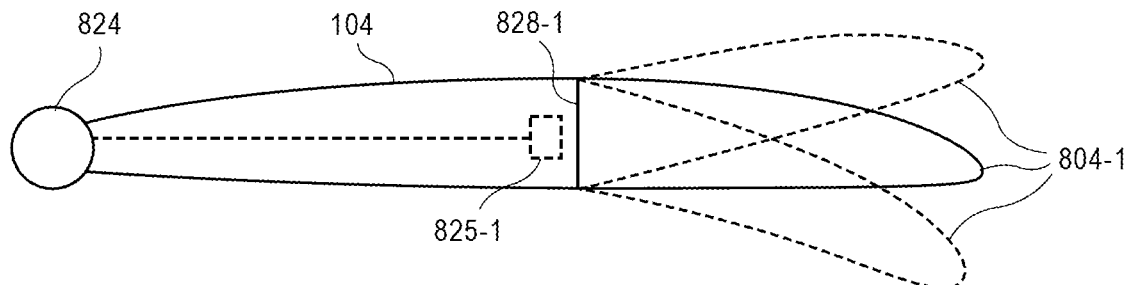
FIGS. 8A-8D illustrate views of a propeller blade of a propulsion mechanism having an adjustable orientation and/or adjustable length, in accordance with disclosed implementations.

As shown in FIG. 8A, the propeller blade 104 extending from propeller hub 824 may include an adjustable blade section 804-1, e.g., a tip section, that is movably or pivotably connected to the propeller blade 104 at a hinge or pivotable connection 828-1. For example, an actuator 825-1 may be coupled between the blade section 804-1 and the blade 104 at or around the pivotable connection 828-1, and the actuator 825-1 may be connected via electrical lines or wirelessly (shown as dashed lines) to an aerial vehicle control system, a part thereof, or another component in communication with the aerial vehicle control system, in order to receive power and/or instructions or commands. The actuator 825-1 may be configured to modify the angular orientation of the blade section 804-1 relative to the blade 104, such that the blade section 804-1 may rotate or pivot forward and/or rearward within a plane of the blade 104. Rotating, or sweeping, the blade section 804-1 forward or rearward within a plane of the blade 104 may alter a magnitude and/or a direction of thrust or lift generated by the blade section 804-1. Other numbers or arrangements of actuators may also be mounted or coupled between the blade section 804-1 and blade 104.

The actuator 825-1 may include one or more of a clutch, a switch, a bias element or spring, a damper, a spring-loaded actuator, a servo, a solenoid, a motor, a screw actuator, a geared actuator, a magnetic actuator, a linear actuator, a rotary actuator, a piezoelectric actuator, or various other types of actuators. In addition, the actuator 825-1 may be configured for one-time actuation, e.g., upon detection of a propulsion mechanism failure or other aerial vehicle fault or failure, may be configured for one-way or two-way actuation, may be configured for binary actuation between two different positions, and/or may be configured for variable actuation between a plurality of different positions.

As shown in FIG. 8A, the actuator 825-1 may include a clutch, a switch, or a spring-loaded actuator that moves the blade section 804-1 relative to the blade 104 between two or more angular orientations. In addition, the actuator 825-1 may include a servo or a magnetic actuator that moves the blade section 804-1 relative to the blade 104 between two or more angular orientations. Further, the actuator 825-1 may include a solenoid and a bias element that move the blade section 804-1 relative to the blade 104 between two or more angular orientations. Moreover, the actuator 825-1 may include a motor, a rotary actuator, a linear actuator, a screw actuator, or a geared actuator that moves the blade section 804-1 relative to the blade 104 between two or more angular orientations. Various other actuators or combinations of actuators may be used to effect movement or rotation of the blade section 804-1 relative to the blade 104.

Figure 8B:
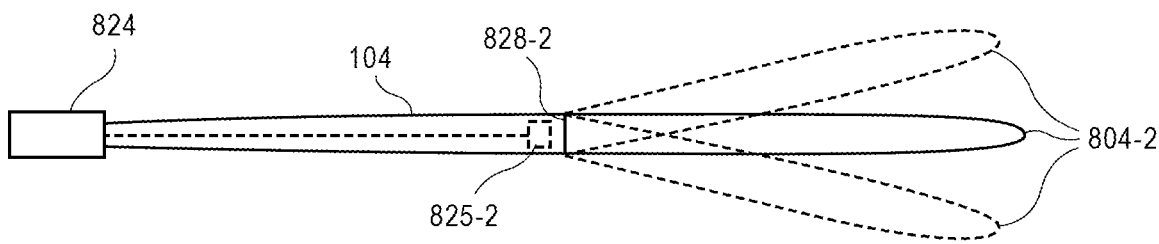

As shown in FIG. 8B, the propeller blade 104 extending from propeller hub 824 may include an adjustable blade section 804-2, e.g., a tip section, that is movably or pivotably connected to the propeller blade 104 at a hinge or pivotable connection 828-2. For example, an actuator 825-2 may be coupled between the blade section 804-2 and the blade 104 at or around the pivotable connection 828-2, and the actuator 825-2 may be connected via electrical lines or wirelessly (shown as dashed lines) to an aerial vehicle control system, a part thereof, or another component in communication with the aerial vehicle control system, in order to receive power and/or instructions or commands. The actuator 825-2 may be configured to modify the angular orientation of the blade section 804-2 relative to the blade 104, such that the blade section 804-2 may rotate or pivot upward and/or downward relative to a plane of the blade 104, e.g., similar to a dihedral or anhedral angle. Rotating or pivoting the blade section 804-2 upward or downward relative to a plane of the blade 104 may alter a magnitude and/or a direction of thrust or lift generated by the blade section 804-2. Other numbers or arrangements of actuators may also be mounted or coupled between the blade section 804-2 and blade 104.

The actuator 825-2 may include one or more of a clutch, a switch, a bias element or spring, a damper, a spring-loaded actuator, a servo, a solenoid, a motor, a screw actuator, a geared actuator, a magnetic actuator, a linear actuator, a rotary actuator, a piezoelectric actuator, or various other types of actuators. In addition, the actuator 825-2 may be configured for one-time actuation, e.g., upon detection of a propulsion mechanism failure or other aerial vehicle fault or failure, may be configured for one-way or two-way actuation, may be configured for binary actuation between two different positions, and/or may be configured for variable actuation between a plurality of different positions.

As shown in FIG. 8B, the actuator 825-2 may include a clutch, a switch, or a spring-loaded actuator that moves the blade section 804-2 relative to the blade 104 between two or more angular orientations. In addition, the actuator 825-2 may include a servo or a magnetic actuator that moves the blade section 804-2 relative to the blade 104 between two or more angular orientations. Further, the actuator 825-2 may include a solenoid and a bias element that move the blade section 804-2 relative to the blade 104 between two or more angular orientations. Moreover, the actuator 825-2 may include a motor, a rotary actuator, a linear actuator, a screw actuator, or a geared actuator that moves the blade section 804-2 relative to the blade 104 between two or more angular orientations. Various other actuators or combinations of actuators may be used to effect movement or rotation of the blade section 804-2 relative to the blade 104.

Figure 8C:
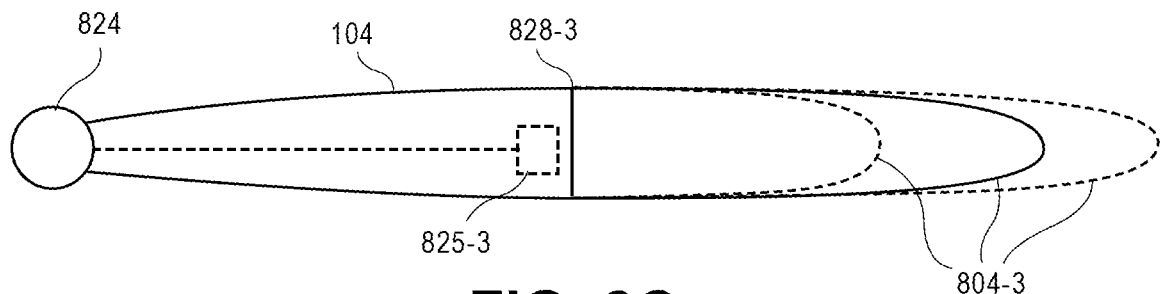

As shown in FIG. 8C, the propeller blade 104 extending from propeller hub 824 may include an adjustable blade section 804-3, e.g., a tip section, that is movably connected to the propeller blade 104 at a movable connection 828-3. For example, an actuator 825-3 may be coupled between the blade section 804-3 and the blade 104 at or around the movable connection 828-3, and the actuator 825-3 may be connected via electrical lines or wirelessly (shown as dashed lines) to an aerial vehicle control system, a part thereof, or another component in communication with the aerial vehicle control system, in order to receive power and/or instructions or commands. The actuator 825-3 may be configured to modify the position or length of the blade section 804-3 relative to the blade 104, such that the blade section 804-3 may extend from and/or retract toward the blade 104. Moving, extending, or retracting the blade section 804-3 radially outward or inward relative to the blade 104 may alter a magnitude and/or a direction of thrust or lift generated by the blade section 804-3. Other numbers or arrangements of actuators may also be mounted or coupled between the blade section 804-3 and blade 104.

The actuator 825-3 may include one or more of a clutch, a switch, a bias element or spring, a damper, a spring-loaded actuator, a servo, a solenoid, a motor, a screw actuator, a geared actuator, a magnetic actuator, a linear actuator, a rotary actuator, a piezoelectric actuator, or various other types of actuators. In addition, the actuator 825-3 may be configured for one-time actuation, e.g., upon detection of a propulsion mechanism failure or other aerial vehicle fault or failure, may be configured for one-way or two-way actuation, may be configured for binary actuation between two different positions, and/or may be configured for variable actuation between a plurality of different positions.

As shown in FIG. 8C, the actuator 825-3 may include a clutch, a switch, or a spring-loaded actuator that moves the blade section 804-3 relative to the blade 104 between two or more positions or lengths. In addition, the actuator 825-3 may include a servo or a magnetic actuator that moves the blade section 804-3 relative to the blade 104 between two or more positions or lengths. Further, the actuator 825-3 may include a solenoid and a bias element that move the blade section 804-3 relative to the blade 104 between two or more positions or lengths. Moreover, the actuator 825-3 may include a motor, a rotary actuator, a linear actuator, a screw actuator, or a geared actuator (such as a rack and pinion) that moves the blade section 804-3 relative to the blade 104 between two or more positions or lengths. Various other actuators or combinations of actuators may be used to effect movement or translation of the blade section 804-3 relative to the blade 104.

Figure 8D:
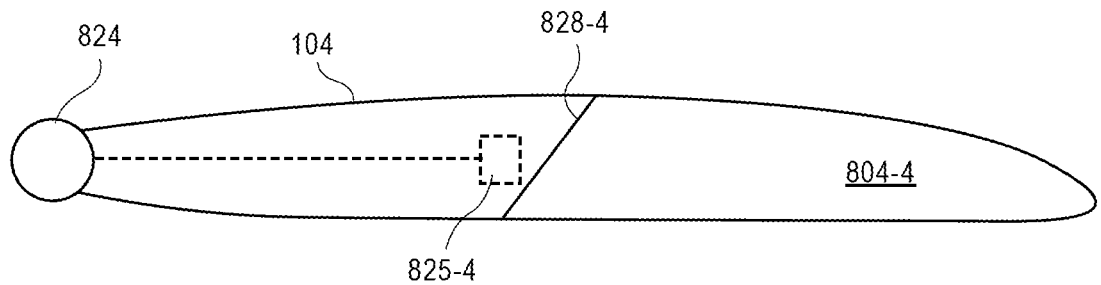

As shown in FIG. 8D, the propeller blade 104 extending from propeller hub 824 may include an adjustable blade section 804-4, e.g., a tip section, that is movably or pivotably connected to the propeller blade 104 at a hinge or pivotable connection 828-4 that is disposed at an angle relative to a chord length of the blade 104. For example, an actuator 825-4 may be coupled between the blade section 804-4 and the blade 104 at or around the pivotable connection 828-4, and the actuator 825-4 may be connected via electrical lines or wirelessly (shown as dashed lines) to an aerial vehicle control system, a part thereof, or another component in communication with the aerial vehicle control system, in order to receive power and/or instructions or commands. The actuator 825-4 may be configured to modify the angular orientation of the blade section 804-4 relative to the blade 104, such that the blade section 804-4 may rotate or pivot upward with a downward pitch change and/or rotate or pivot downward with an upward pitch change relative to a plane of the blade 104. Rotating or pivoting the blade section 804-4 upward or downward relative to a plane of the blade 104 may alter a magnitude and/or a direction of thrust or lift generated by the blade section 804-4. Other numbers or arrangements of actuators may also be mounted or coupled between the blade section 804-4 and blade 104.

The actuator 825-4 may include one or more of a clutch, a switch, a bias element or spring, a damper, a spring-loaded actuator, a servo, a solenoid, a motor, a screw actuator, a geared actuator, a magnetic actuator, a linear actuator, a rotary actuator, a piezoelectric actuator, or various other types of actuators. In addition, the actuator 825-4 may be configured for one-time actuation, e.g., upon detection of a propulsion mechanism failure or other aerial vehicle fault or failure, may be configured for one-way or two-way actuation, may be configured for binary actuation between two different positions, and/or may be configured for variable actuation between a plurality of different positions.

As shown in FIG. 8D, the actuator 825-4 may include a clutch, a switch, or a spring-loaded actuator that moves the blade section 804-4 relative to the blade 104 between two or more angular orientations. In addition, the actuator 825-4 may include a servo or a magnetic actuator that moves the blade section 804-4 relative to the blade 104 between two or more angular orientations. Further, the actuator 825-4 may include a solenoid and a bias element that move the blade section 804-4 relative to the blade 104 between two or more angular orientations. Moreover, the actuator 825-4 may include a motor, a rotary actuator, a linear actuator, a screw actuator, or a geared actuator that moves the blade section 804-4 relative to the blade 104 between two or more angular orientations. Various other actuators or combinations of actuators may be used to effect movement or rotation of the blade section 804-4 relative to the blade 104.

With respect to the descriptions of FIGS. 7A-8D herein, the changes in orientations, positions, and/or lengths of portions or sections of propeller blades may be used to modify a direction of thrust generated by the propeller blade and associated motor. That is, the propeller blade may generate thrust in a first direction over a first arc of its travel during a single revolution and may generate thrust in a second, different direction over a second arc of its travel during the single revolution. For example, if an actuator associated with a portion or section of a propeller blade is able to actuate the portion or section multiple times per revolution of the propeller blade, then the direction of thrust generated by the propeller blade and associated motor may be dynamically modified during a single revolution as a result of the actuation of the portion or section. For example, the control surfaces or trim tabs 709 described with respect to FIG. 7A, the tip section 704-1 described with respect to FIG. 7B, the tip section 804-2 described with respect to FIG. 8B, and/or the tip section 804-4 described with respect to FIG. 8D may be actuated multiple times, e.g., at least two times, per revolution of the propeller blade to thereby modify the direction of thrust generated by the propeller blade and associated motor.

In addition, with respect to the descriptions of FIGS. 7A-8D herein, the changes in orientations, positions, and/or lengths of portions or sections of propeller blades may be used to modify a magnitude of thrust generated by the propeller blade and associated motor during each revolution of the propeller blade. That is, the propeller blade may generate thrust with a first magnitude over a first arc of its travel during a single revolution and may generate thrust with a second, different magnitude over a second arc of its travel during the single revolution. For example, if an actuator associated with a portion or section of a propeller blade is able to actuate the portion or section multiple times per revolution of the propeller blade, then the magnitude of thrust generated by the propeller blade and associated motor may be dynamically modified during a single revolution as a result of the actuation of the portion or section. For example, the control surfaces or trim tabs 709 described with respect to FIG. 7A, the tip section 704-1 described with respect to FIG. 7B, and/or the tip sections 804 described with respect to FIGS. 8A-8D may be actuated multiple times, e.g., at least two times, per revolution of the propeller blade to thereby modify the magnitude of thrust generated by the propeller blade and associated motor during each revolution of the propeller blade.

Figure 9A:
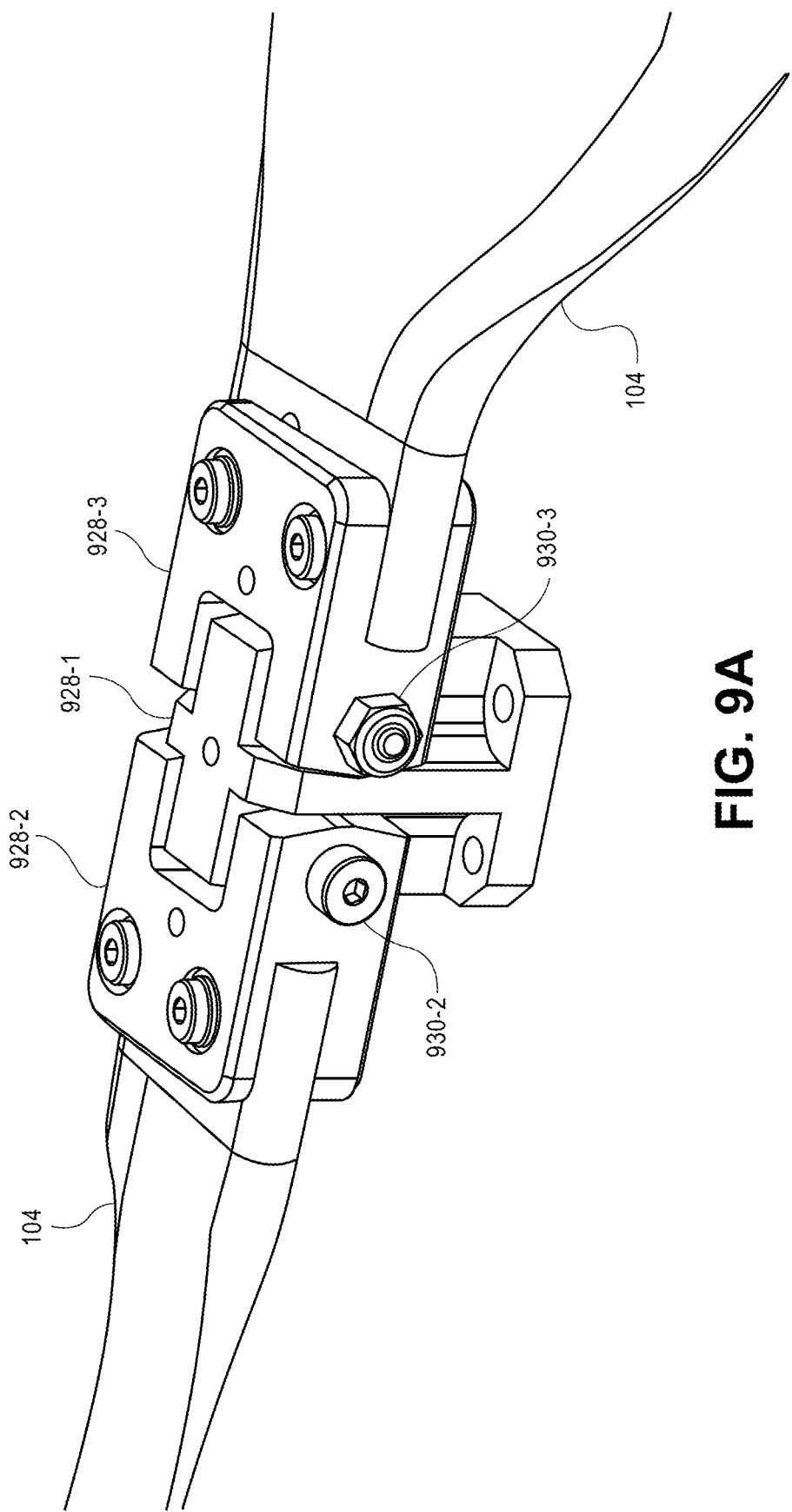

FIGS. 9A and 9B illustrate views of a propeller hub of a propulsion mechanism having hinged, flapping propeller blades, in accordance with disclosed implementations.

As shown in FIG. 9A, the propeller hub may include a base 928-1 and two root sections 928-2 and 928-3. Each of the two root sections 928-2, 928-3 may be coupled to a respective propeller blade 104. In addition, each of the two root sections 928-2, 928-3 may be hingedly or pivotably coupled to the base 928-1. For example, the root section 928-2 may be hingedly or pivotably coupled to base 928-1 at hinge axis 930-2. In addition, the root section 928-3 may be hinged or pivotably coupled to base 928-1 at hinge axis 930-3.

Each root section 928-2, 928-3 may be freely pivotable about the respective hinge axis 930-2, 930-3. In example embodiments, the base 928-1 and root sections 928-2, 928-3 may include mechanical stops or interfaces that limit the range of pivoting movement of each root section 928-2, 928-3 relative to the base 928-1. For example, each root section 928-2, 928-3 may be limited to approximately five degrees of pivoting movement relative to a nominal, centered position of the root sections 928-2, 928-3 relative to the base 928-1. In other example embodiments, the limit of the range of pivoting movement may be less than or greater than five degrees relative to the nominal, centered position. In addition, the limit for pivoting upward may be different from the limit for pivoting downward. Further, the limits for each propeller blade may be different from the limits for other propeller blades.

By allowing the freely pivotable movement, e.g., flapping, of the root sections 928-2, 928-3 and associated blades 104 relative to the base 928-1, vibrations generated or experienced by the propeller blades 104 that are transferred to other portions of an aerial vehicle via the propellers and propeller hub may be dampened or reduced.

In further example embodiments, instead of allowing freely pivotable movement of the root sections 928-2, 928-3 and associated blades 104 relative to the base 928-1, various actuators or combinations of actuators as described herein may be included or associated with portions of the propeller hub to actuate changes in angular orientation of each of the root sections 928-2, 928-3 and associated blades 104 relative to the base 928-1. In such embodiments, the modifications to and resultant effects of propeller reconfiguration may be similar to those described herein with respect to FIGS. 7B and 8B. Further, one or more of the root sections 928-2, 928-3 may include a spring, bias element, or other similar components to maintain the root sections 928-2, 928-3 in respective nominal positions relative to the base 928-1 in the absence of external loads or forces.

As shown in FIG. 9B, the propeller hub may include a base 928-5 and two root sections 928-6 and 928-7. Each of the two root sections 928-6, 928-7 may be coupled to a respective propeller blade 104. In addition, each of the two root sections 928-6, 928-7 may be hingedly or pivotably coupled to the base 928-5. For example, the root section 928-6 may be hingedly or pivotably coupled to base 928-5 at hinge axis 930-6. In addition, the root section 928-7 may be hinged or pivotably coupled to base 928-5 at hinge axis 930-7.

Each root section 928-6, 928-7 may be freely pivotable about the respective hinge axis 930-6, 930-7. In example embodiments, the base 928-5 and root sections 928-6, 928-7 may include mechanical stops or interfaces that limit the range of pivoting movement of each root section 928-6, 928-7 relative to the base 928-5. For example, each root section 928-6, 928-7 may be limited to approximately five degrees of pivoting movement relative to a nominal, centered position of the root sections 928-6, 928-7 relative to the base 928-5. In other example embodiments, the limit of the range of pivoting movement may be less than or greater than five degrees relative to the nominal, centered position. In addition, the limit for pivoting upward may be different from the limit for pivoting downward. Further, the limits for each propeller blade may be different from the limits for other propeller blades.

In contrast to the example embodiment described with respect to FIG. 9A, each of the hinge axes 930-6, 930-7 of respective root sections 928-6, 928-7 may be angled or pivoted so as not to be perpendicular with axes that run substantially along lengths of respective propeller blades 104. By incorporating such angles into the hinge axes 930-6, 930-7, the pivoting movement of each root section and associated propeller blade may also result in a pitch change of the propeller blade. For example, responsive to upward pivoting movement of a root section and associated propeller blade, the propeller blade may also experience a downward pitch change. Likewise, responsive to downward pivoting movement of a root section and associated propeller blade, the propeller blade may also experience an upward pitch change.

By allowing the freely pivotable movement, e.g., flapping, of the root sections 928-6, 928-7 and associated blades 104 relative to the base 928-5, vibrations generated or experienced by the propeller blades 104 that are transferred to other portions of an aerial vehicle via the propellers and propeller hub may be dampened or reduced.

In further example embodiments, instead of allowing freely pivotable movement of the root sections 928-6, 928-7 and associated blades 104 relative to the base 928-5, various actuators or combinations of actuators as described herein may be included or associated with portions of the propeller hub to actuate changes in angular orientation of each of the root sections 928-6, 928-7 and associated blades 104 relative to the base 928-5. In such embodiments, the modifications to and resultant effects of propeller reconfiguration may be similar to those described herein with respect to FIG. 8D. Further, one or more of the root sections 928-6, 928-7 may include a spring, bias element, or other similar components to maintain the root sections 928-6, 928-7 in respective nominal positions relative to the base 928-5 in the absence of external loads or forces.

Figure 10A:
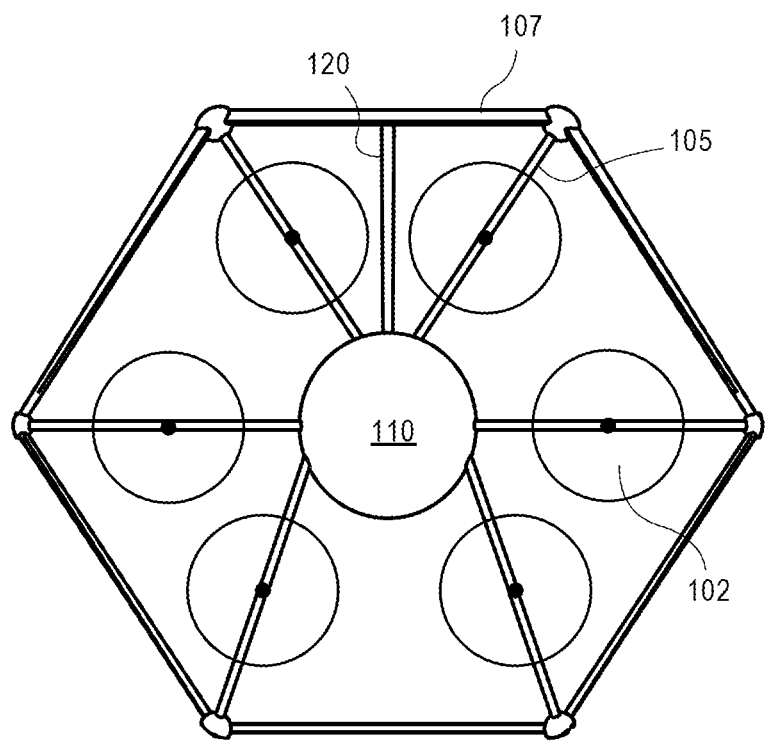
FIGS. 10A-10C illustrate various views of an aerial vehicle having propulsion mechanisms with adjustable propellers and/or adjustable propeller blades, in accordance with disclosed implementations.
Figure 10B:
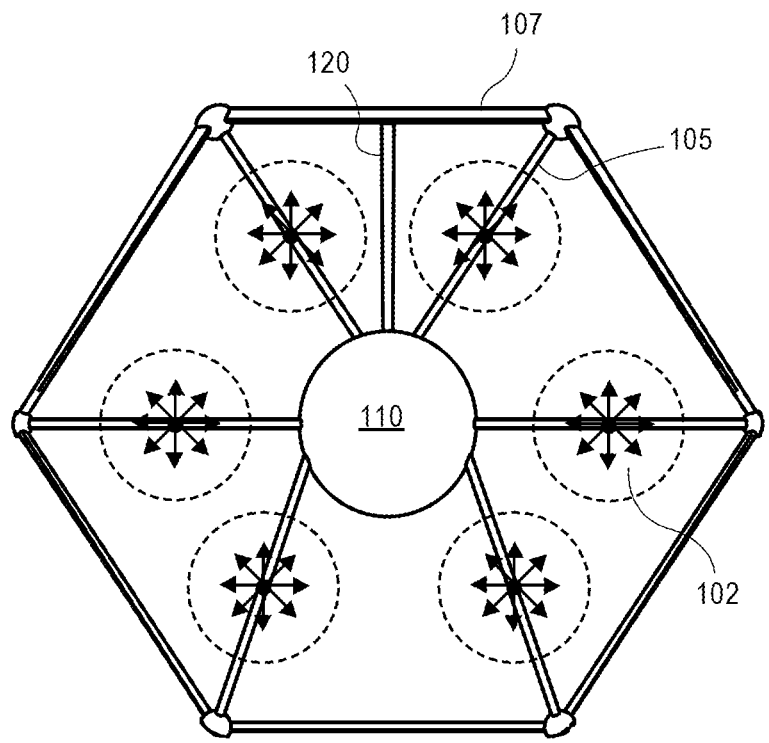
Figure 10C:
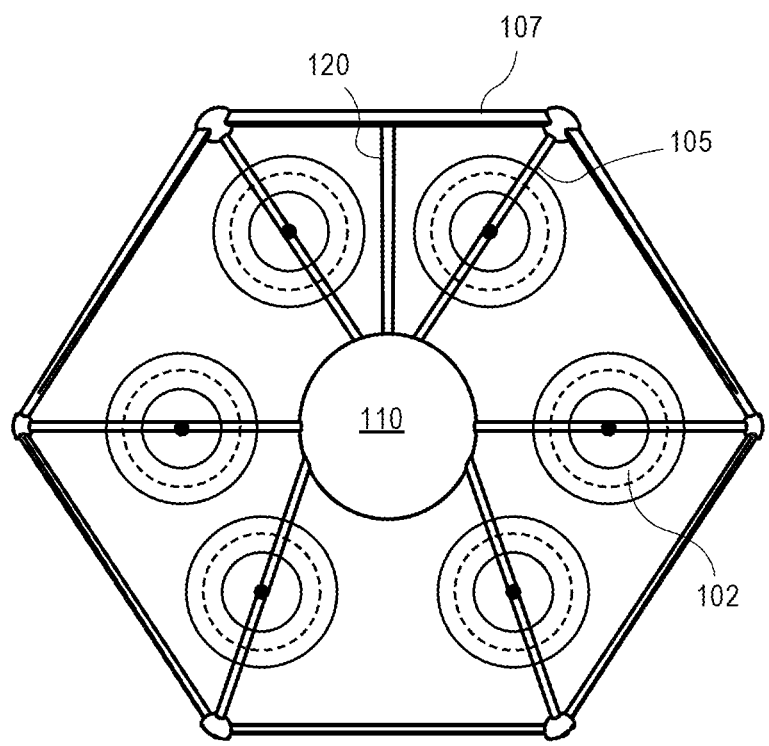

FIGS. 10A-10C illustrate various views of an aerial vehicle having propulsion mechanisms with adjustable propellers and/or adjustable propeller blades, in accordance with disclosed implementations.

As shown in FIG. 10A, one or more propellers and/or blades of the propulsion mechanisms 102, e.g., all propellers and/or blades or all except any faulty or failed propellers and/or blades, may be reconfigured such that the propellers associated with the propulsion mechanisms 102 may have modified cant angles to rotate within the same plane, or within parallel planes. That is, the propellers associated with the propulsion mechanisms 102 may be planarized, e.g., by modifying cants of propellers using propeller cams or similar mechanisms. By planarizing the operational propellers of the propulsion mechanisms 102, control of an aerial vehicle that has experienced a fault or failure of a propulsion mechanism may be simplified or improved.

As shown in FIG. 10B, one or more propellers and/or blades of the propulsion mechanisms 102, e.g., all propellers and/or blades or all except any faulty or failed propellers and/or blades, may be reconfigured such that the propellers and/or blades associated with the propulsion mechanisms 102 may have modified angular orientations in any direction. That is, the propellers and/or blades associated with the propulsion mechanisms 102 may be reconfigured with angular orientations and/or positions of the blades, or portions or sections thereof, to modify directions of thrust generated by the propellers and/or blades. By modifying angular orientations and/or positions of blades, or portions or sections thereof, control of an aerial vehicle that has experienced a fault or failure of a propulsion mechanism may be simplified or improved.

As shown in FIG. 10C, one or more propellers and/or blades of the propulsion mechanisms 102, e.g., all propellers and/or blades or all except any faulty or failed propellers and/or blades, may be reconfigured such that the propellers and/or blades associated with the propulsion mechanisms 102 may have modified positions and/or lengths to alter spans of the propellers and/or blades. That is, the propellers and/or blades associated with the propulsion mechanisms 102 may be reconfigured with positions and/or lengths of the blades, or portions or sections thereof, to modify magnitudes of thrust generated by the propellers and/or blades. By modifying positions and/or lengths of blades, or portions or sections thereof, control of an aerial vehicle that has experienced a fault or failure of a propulsion mechanism may be simplified or improved.

Although FIGS. 6A-10C describe various individual reconfigurations of propellers and/or blades of propulsion mechanisms of an aerial vehicle such as modifications to angular orientations, positions, and/or lengths, in various example embodiments, each propeller and/or blade of a propulsion mechanism of an aerial vehicle may be modified with any combination of changes to angular orientations, positions, and/or lengths. Further, although FIGS. 10A-10C generally describe the same or similar modifications to angular orientations, positions, and/or lengths of each of the propellers and/or blades of propulsion mechanisms of an aerial vehicle, in various example embodiments, each propeller and/or blade of a propulsion mechanism of an aerial vehicle may be modified differently from other propellers and/or blades of propulsion mechanisms of the aerial vehicle. By various combinations of modifications to angular orientations, positions, and/or lengths of one or more propellers and/or blades of propulsion mechanisms of an aerial vehicle, control and safety of the aerial vehicle may be improved or increased responsive to various potential faults or failures associated with one or more propulsion mechanisms of an aerial vehicle.

Figure 11:
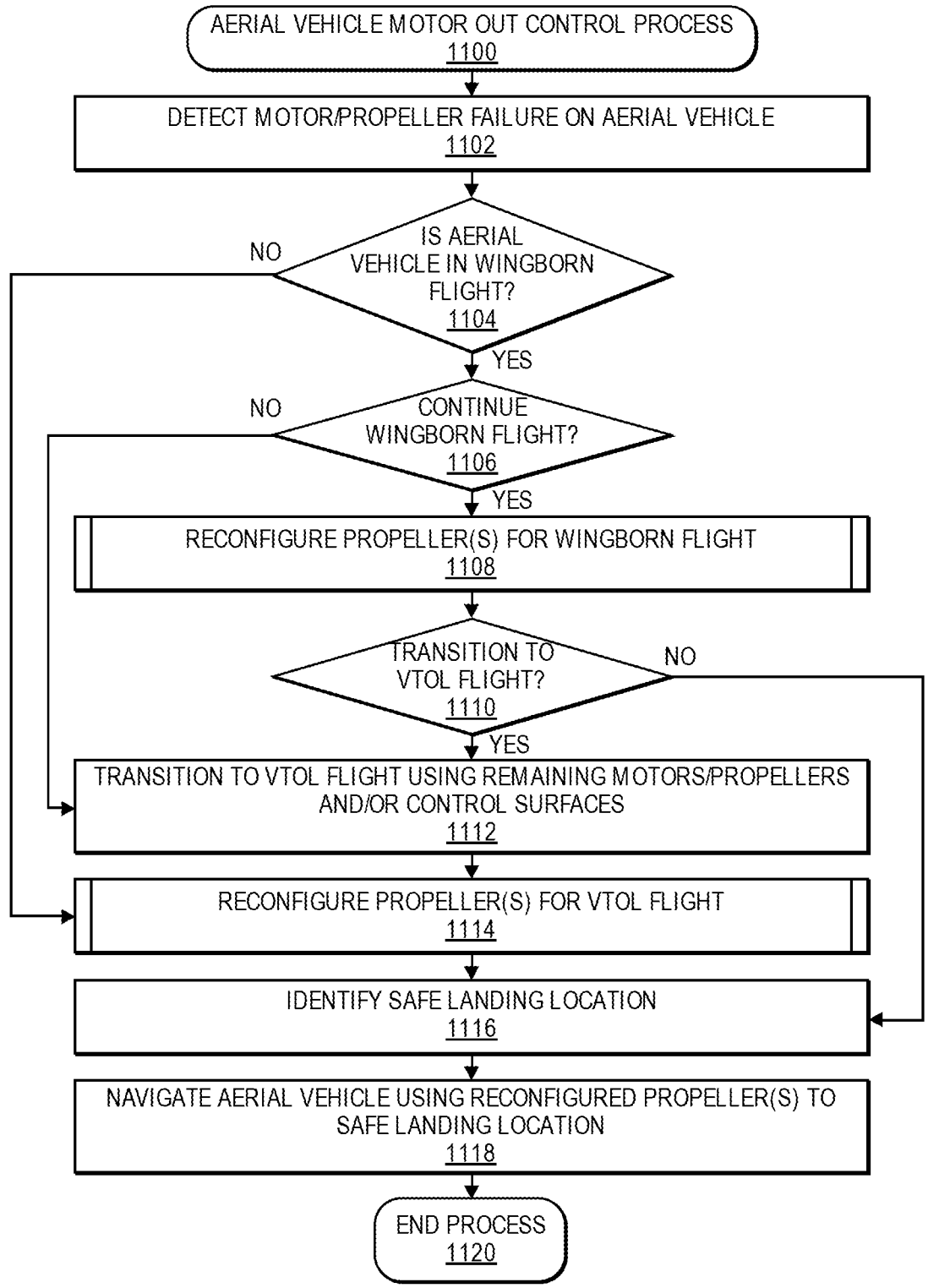
FIG. 11 illustrates a flow diagram of an example aerial vehicle motor out control process, in accordance with disclosed implementations.

FIG. 11 illustrates a flow diagram of an example aerial vehicle motor out control process 1100, in accordance with disclosed implementations.

The process 1100 may begin by detecting a motor/propeller failure on an aerial vehicle, as at 1102. For example, the motor/propeller failure may be a propulsion mechanism failure. In addition, the detected failure may be any of the various types of faults that may result in motor out situations, as described herein.

The process 1100 may continue by determining whether the aerial vehicle is currently in wingborn flight, as at 1104. For example, wingborn flight may be synonymous with navigation of the aerial vehicle in a substantially horizontal direction, as described with reference to FIGS. 1 and 3-5. This may be determined based on data associated with the flight controller and/or one or more motor controllers. In addition, this may be determined based on a flight plan of the aerial vehicle. Further, this may be determined based on data associated with one or more sensors, such as an inertial measurement unit, accelerometers, and/or gyroscopes.

If it is determined that the aerial vehicle is currently in wingborn flight, it may then be determined whether the aerial vehicle is to continue wingborn flight, as at 1106. This may be determined based on a flight plan of the aerial vehicle, controllability of the aerial vehicle due to the motor out situation, remaining power or range of the aerial vehicle, additional drag due to the motor out situation, distance to a safe landing location for the aerial vehicle, objects, people, and/or obstacles in an environment of the aerial vehicle, temperature, wind, precipitation, pressure, or other environmental factors, and/or various other factors.

If it is determined that the aerial vehicle is to continue wingborn flight, then the process 1100 may proceed by reconfiguring one or more propellers and/or blades for wingborn flight, as at 1108. For example, one or more propellers and/or blades may be reconfigured to have modified angular orientations, positions, and/or lengths in order to maintain control and safety of the aerial vehicle in wingborn flight responsive to the motor out situation. For example, angular orientations of one or more propellers and/or blades may be modified to provide additional thrust in the direction of travel to maintain wingborn flight. In addition, positions and/or lengths of one or more propellers and/or blades may also be modified to provide additional thrust to the aerial vehicle to maintain wingborn flight. The determination of whether to continue with wingborn flight may also be based on a flight plan of the aerial vehicle, controllability of the aerial vehicle due to the motor out situation, remaining power or range of the aerial vehicle, additional drag due to the motor out situation, distance to a safe landing location for the aerial vehicle, objects, people, and/or obstacles in an environment of the aerial vehicle, temperature, wind, precipitation, pressure, or other environmental factors, and/or various other factors.

After reconfiguring the propellers and/or blades and continuing wingborn flight, as at 1108, the process 1100 may then continue by determining whether to transition to VTOL flight, as at 1110. The determination of whether to transition to VTOL flight may also be based on a flight plan of the aerial vehicle, controllability of the aerial vehicle due to the motor out situation, remaining power or range of the aerial vehicle, additional drag due to the motor out situation, distance to a safe landing location for the aerial vehicle, objects, people, and/or obstacles in an environment of the aerial vehicle, temperature, wind, precipitation, pressure, or other environmental factors, and/or various other factors.

If it is determined that the aerial vehicle is to transition to VTOL flight, as at 1110, or after determining that the aerial vehicle is not to continue in wingborn flight, as at 1106, then the process 1100 may proceed to transition the aerial vehicle from wingborn flight to VTOL flight using any control surfaces and/or any remaining propulsion mechanisms, as at 1112. As described herein, the aerial vehicle may transition from wingborn flight to VTOL flight by reducing pitch and/or speed of the aerial vehicle such that the ring wing produces less lift and the aerial vehicle pitches rearward to a VTOL flight orientation, as described with respect to FIG. 2.

After transitioning to VTOL flight, as at 1112, or after determining that the aerial vehicle is not currently in wingborn flight, as at 1104, the process 1100 may continue by reconfiguring one or more propellers and/or blades for VTOL flight, as at 1114. For example, one or more propellers and/or blades may be reconfigured to have modified angular orientations, positions, and/or lengths in order to maintain control and safety of the aerial vehicle in VTOL flight responsive to the motor out situation. For example, angular orientations and/or lengths of one or more propellers and/or blades may be modified to provide additional hovering thrust to maintain VTOL flight. In some examples, angular orientations of one or more propellers and/or blades may be modified to planarize the propellers and simplify or improve control in VTOL flight. In addition, angular orientations of one or more propellers and/or blades may be modified to pivot radially inward or radially outward relative to the fuselage to improve control and safety of the aerial vehicle in VTOL flight. Further, positions and/or lengths of one or more propellers and/or blades may be modified to provide additional thrust to the aerial vehicle in VTOL flight.

After reconfiguring one or more propellers and/or blades for VTOL flight, as at 1114, or after determining that the aerial vehicle is not to transition to VTOL flight and instead continue with wingborn flight, as at 1110, the process 1100 may proceed by identifying a safe landing location, as at 1116. For example, the safe landing location may be predetermined and stored by or provided to the aerial vehicle. Various safe landing locations may be identified and stored beforehand, and the aerial vehicle may identify a closest available safe landing location responsive to the motor out situation. In other examples, the aerial vehicle may use one or more sensors, such as imaging devices, radar, LIDAR, proximity sensors, inertial measurement units, navigation sensors such as global positioning sensors, and/or other types of sensors, to identify a safe landing location responsive to the motor out situation. Various other types of sensors, beacons, or communication devices may also be used to identify a safe landing location for the aerial vehicle.

The process 1100 may then continue to control the aerial vehicle using the reconfigured one or more propellers and/or blades to the safe landing location, as at 1118. For example, the aerial vehicle may reconfigure one or more propellers and/or blades for wingborn flight and/or may reconfigure one or more propellers and/or blades for VTOL flight, and the aerial vehicle may navigate to the identified safe landing location using the reconfigured one or more propellers and/or blades, as well as based on data from one or more sensors, such as imaging devices and navigation sensors. The process 1100 may then end, as at 1120.

Figure 12:
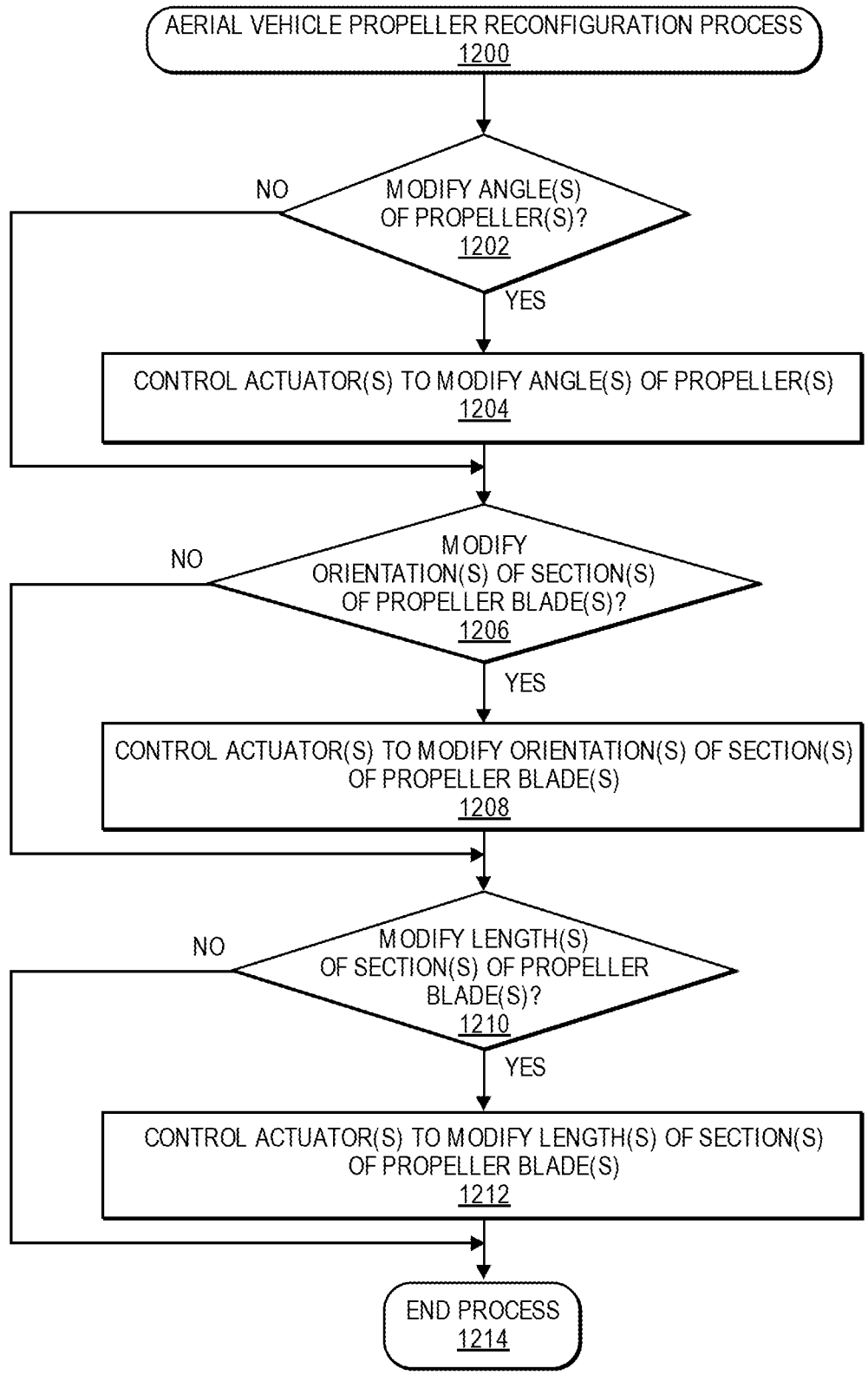
FIG. 12 illustrates a flow diagram of an example aerial vehicle propeller reconfiguration process, in accordance with disclosed implementations.

FIG. 12 illustrates a flow diagram of an example aerial vehicle propeller reconfiguration process 1200, in accordance with disclosed implementations.

The process 1200 may begin by determining whether to modify angular orientations of one or more propellers, as at 1202. If it is determined that angular orientations of one or more propellers are to be modified responsive to a motor out situation, then the process 1200 may continue to control one or more actuators to modify angular orientations of associated propellers, as at 1204. As described herein, various types, numbers, or arrangements of actuators may be associated with each of the one or more propellers, and one or more of such actuators may be actuated to effect changes to angular orientations of the associated propellers, e.g., actuators associated with propeller cams to modify angular orientations of associated propellers.

The process 1200 may then proceed by determining whether to modify angular orientations of one or more propellers, blades, and/or blade sections, as at 1206. If it is determined that angular orientations of one or more propellers, blades, and/or blade sections are to be modified responsive to a motor out situation, then the process 1200 may continue to control one or more actuators to modify angular orientations of associated propellers, blades, and/or blade sections, as at 1208. As described herein, various types, numbers, or arrangements of actuators may be associated with each of the one or more propellers, blades, and/or blade sections, and one or more of such actuators may be actuated to effect changes to angular orientations of the associated propellers, blades, and/or blade sections, which may result in changes to directions of thrust and/or magnitudes of thrust generated by the propellers, blades, and/or blade sections.

The process 1200 may then proceed by determining whether to modify lengths of one or more propellers, blades, and/or blade sections, as at 1210. If it is determined that positions and/or lengths of one or more propellers, blades, and/or blade sections are to be modified responsive to a motor out situation, then the process 1200 may continue to control one or more actuators to modify positions and/or lengths of associated propellers, blades, and/or blade sections, as at 1212. As described herein, various types, numbers, or arrangements of actuators may be associated with each of the one or more propellers, blades, and/or blade sections, and one or more of such actuators may be actuated to effect changes to positions and/or lengths of the associated propellers, blades, and/or blade sections, which may result in changes to magnitudes of thrust generated by the propellers, blades, and/or blade sections.

Figure 13:
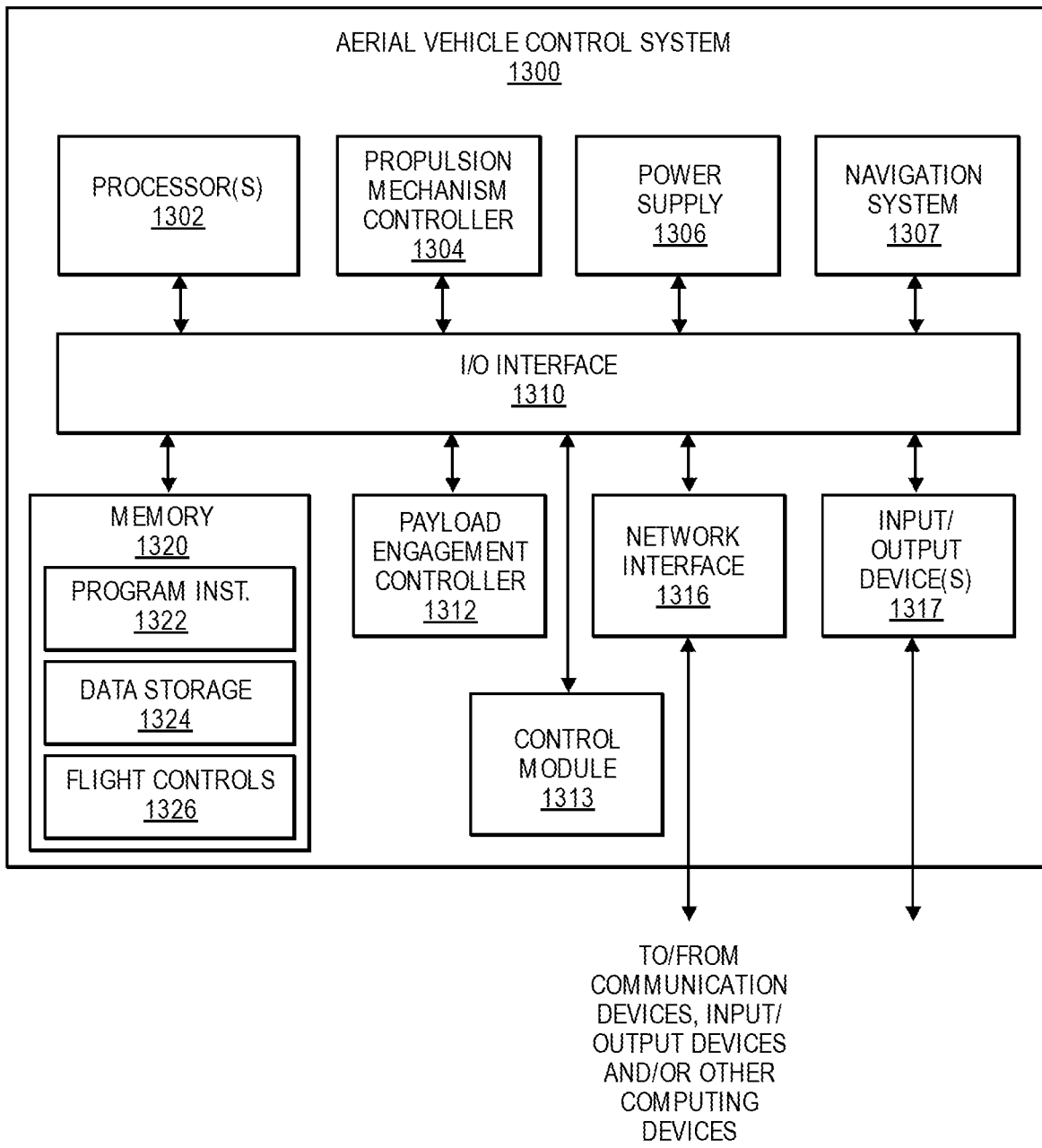
FIG. 13 is a block diagram illustrating various components of an example aerial vehicle control system, in accordance with disclosed implementations.

FIG. 13 is a block diagram illustrating various components of an example aerial vehicle control system 1300, in accordance with disclosed implementations.

In various examples, the block diagram may be illustrative of one or more aspects of the aerial vehicle control system 1300 that may be used to implement the various systems and methods discussed herein and/or to control operation of an aerial vehicle discussed herein. In the illustrated implementation, the aerial vehicle control system 1300 includes one or more processors 1302, coupled to a memory, e.g., a non-transitory computer readable storage medium 1320, via an input/output (I/O) interface 1310. The aerial vehicle control system 1300 also includes propulsion mechanism controllers 1304, such as electronic speed controls (ESCs) or motor controllers, power modules 1306 and/or a navigation system 1307. The aerial vehicle control system 1300 further includes a payload engagement controller 1312, a control module 1313 configured to implement one or more aerial vehicle reconfigurations described herein, a network interface 1316, and one or more input/output devices 1317.

In various implementations, the aerial vehicle control system 1300 may be a uniprocessor system including one processor 1302, or a multiprocessor system including several processors 1302 (e.g., two, four, eight, or another suitable number). The processor(s) 1302 may be any suitable processor capable of executing instructions. For example, in various implementations, the processor(s) 1302 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1302 may commonly, but not necessarily, implement the same ISA.

The non-transitory computer readable storage medium 1320 may be configured to store executable instructions, data, flight paths, flight control parameters, center of gravity information, and/or data items accessible by the processor(s) 1302. In various implementations, the non-transitory computer readable storage medium 1320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1320 as program instructions 1322, data storage 1324 and flight controls 1326, respectively. In other implementations, program instructions, data, and/or flight controls may be received, sent, or stored upon different types of computer-accessible media, such as non-transitory media, or on similar media separate from the non-transitory computer readable storage medium 1320 or the aerial vehicle control system 1300. Generally speaking, a non-transitory, computer readable storage medium may include storage media or memory media such as magnetic or optical media, e.g., disk or CD/DVD-ROM, coupled to the aerial vehicle control system 1300 via the I/O interface 1310. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1316.

In one implementation, the I/O interface 1310 may be configured to coordinate I/O traffic between the processor(s) 1302, the non-transitory computer readable storage medium 1320, and any peripheral devices, the network interface or other peripheral interfaces, such as input/output devices 1317. In some implementations, the I/O interface 1310 may perform any necessary protocol, timing or other data transformations to convert data signals from one component (e.g., non-transitory computer readable storage medium 1320) into a format suitable for use by another component (e.g., processor(s) 1302). In some implementations, the I/O interface 1310 may include support for devices attached through various types of peripheral buses, such as a variant of the Peripheral Component Interconnect (PCI) bus standard or the Universal Serial Bus (USB) standard, for example. In some implementations, the function of the I/O interface 1310 may be split into two or more separate components, such as a north bridge and a south bridge, for example. Also, in some implementations, some or all of the functionality of the I/O interface 1310, such as an interface to the non-transitory computer readable storage medium 1320, may be incorporated directly into the processor(s) 1302.

The propulsion mechanism controllers 1304 may communicate with the navigation system 1307 and adjust the rotational speed, position, orientation, or other parameters of each propulsion mechanism to implement one or more aerial vehicle reconfigurations, to stabilize the aerial vehicle, and/or to perform one or more maneuvers and guide the aerial vehicle along a flight path and/or to a safe landing location.

The navigation system 1307 may include a global positioning system (GPS), indoor positioning system (IPS), or other similar system and/or sensors that can be used to navigate the aerial vehicle to and/or from a location. The payload engagement controller 1312 communicates with the actuator(s) or motor(s) (e.g., a servo motor) used to engage and/or disengage items.

The control module 1313 may comprise or form a part of a flight controller that is configured to implement one or more aerial vehicle reconfigurations described herein, such as modifying angular orientations of one or more propellers, blades, and/or blade sections, modifying positions of one or more propellers, blades, and/or blade sections, modifying lengths of one or more propellers, blades, and/or blade sections, or other reconfigurations of propellers, blades, and/or blade sections of the aerial vehicle. Further, the control module 1313 may also be configured to control wingborn or horizontal flight of the aerial vehicle, VTOL flight of the aerial vehicle, and transitions between wingborn and VTOL flight orientations of the aerial vehicle. The control module 1313 may send and/or receive data to/from one or more sensors, such as imaging devices, an inertial measurement unit, accelerometers, gyroscopes, navigation sensors, or other sensors, and/or the control module 1313 may send and/or receive data to/from propulsion mechanism controllers 1304 associated with respective propulsion mechanisms. In some example embodiments, the control module 1313 may be integrated with or form a part of one or more of the processors 1302, the propulsion mechanism controllers 1304, and/or the navigation system 1307.

The network interface 1316 may be configured to allow data to be exchanged between the aerial vehicle control system 1300, other devices attached to a network, such as other computer systems (e.g., remote computing resources), and/or with aerial vehicle control systems of other aerial vehicles. For example, the network interface 1316 may enable wireless communication between the aerial vehicle and an aerial vehicle control system that is implemented on one or more remote computing resources. For wireless communication, an antenna of the aerial vehicle or other communication components may be utilized. As another example, the network interface 1316 may enable wireless communication between numerous aerial vehicles. In various implementations, the network interface 1316 may support communication via wireless general data networks, such as a Wi-Fi network. For example, the network interface 1316 may support communication via telecommunications networks, such as cellular communication networks, satellite networks, and the like.

Input/output devices 1317 may, in some implementations, include one or more displays, imaging devices, thermal sensors, infrared sensors, time of flight sensors, accelerometers, pressure sensors, weather sensors, etc. Multiple input/output devices 1317 may be present and controlled by the aerial vehicle control system 1300. One or more of these sensors may be utilized to implement the aerial vehicle reconfigurations described herein, as well as to detect failures or faults, control wingborn or VTOL flight, effect transitions between wingborn and VTOL configurations, identify safe landing locations, and/or any other operations or functions described herein.

As shown in FIG. 13, the memory may include program instructions 1322, which may be configured to implement the example routines and/or sub-routines described herein. The data storage 1324 may include various data stores for maintaining data items that may be provided for aerial vehicle reconfigurations, determining flight paths, landing, identifying locations for disengaging items, determining which propulsion mechanisms to utilize to execute a maneuver, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1300 is merely illustrative and is not intended to limit the scope of the present disclosure. In particular, the computing system and devices may include any combination of hardware or software that can perform the indicated functions. The aerial vehicle control system 1300 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 1300. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 1300 may be transmitted to the aerial vehicle control system 1300 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

While the above examples have been described with respect to aerial vehicles, the disclosed implementations may also be used for other forms of vehicles, including, but not limited to, ground based vehicles and water based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and that "vertical" flight refers to flight traveling substantially radially outward from or inward toward the earth's center. It should be understood by those having ordinary skill that trajectories may include components of both "horizontal" and "vertical" flight vectors.

Although the invention has been described and illustrated with respect to illustrative implementations thereof, the foregoing and various other additions and omissions may be made therein and thereto without departing from the spirit and scope of the present disclosure.

What is claimed is:

1. An aerial vehicle, comprising:
    a fuselage;
    six motor arms coupled to and extending from the fuselage;
    six motors, each motor coupled to a respective motor arm and positioned around the fuselage;
    six propellers, each propeller coupled to and rotated by a respective motor;
    a ring wing coupled to outer ends of the six motor arms and positioned around the fuselage, the six motors, and the six propellers; and
    six actuators, each actuator coupled to a respective propeller and configured to alter at least one of an orientation or a length of at least one blade of the respective propeller.

2. The aerial vehicle of claim 1, wherein angles of the six propellers are configured to be altered relative to at least one of the fuselage, the six motor arms, or the six motors.

3. The aerial vehicle of claim 1, wherein angles of at least a portion of the at least one blade of the six propellers are configured to be altered relative to roots of the at least one blade of the six propellers.

4. The aerial vehicle of claim 1, wherein lengths of the at least one blade of the six propellers are configured to be altered.

5. The aerial vehicle of claim 1, further comprising:
    a controller configured to at least:
        detect a failure of a first propeller of the six propellers;
        responsive to the detected failure, actuate at least one actuator of the six actuators to alter at least one of the orientation or the length of the at least one blade of the respective propeller;
        identify a safe landing location for the aerial vehicle; and
        navigate the aerial vehicle to the safe landing location.

6. An aerial vehicle, comprising:
    a fuselage;
    a plurality of propulsion mechanism arms coupled to and extending from the fuselage;
    a plurality of propulsion mechanisms, each propulsion mechanism coupled to a respective propulsion mechanism arm and positioned around the fuselage;
    a plurality of propellers, each propeller coupled to and rotated by a respective propulsion mechanism;
    a ring wing coupled to outer ends of the plurality of propulsion mechanism arms and positioned around the fuselage and the plurality of propulsion mechanisms; and a first actuator coupled to a first propeller and configured to alter at least one of an orientation or a length of at least one blade of the first propeller.

7. The aerial vehicle of claim 6, wherein the first actuator is configured to alter an angle of the first propeller relative to a first propulsion mechanism to which the first propeller is coupled.

8. The aerial vehicle of claim 6, wherein the first actuator is configured to alter at least one of an angle or a position of at least a portion of the at least one blade of the first propeller.

9. The aerial vehicle of claim 8, wherein the at least a portion of the at least one blade comprises at least one of a control surface or a trim tab of the at least one blade.

10. The aerial vehicle of claim 8, wherein the at least a portion of the at least one blade comprises a tip section of the at least one blade.

11. The aerial vehicle of claim 10, wherein the first actuator is configured to alter the angle of the tip section of the at least one blade at least one of: upward outside a plane of rotation of the first propeller, downward outside the plane of rotation of the first propeller, forward inside the plane of rotation of the first propeller, or rearward inside the plane of rotation of the first propeller.

12. The aerial vehicle of claim 10, wherein the first actuator is configured to alter the position of the tip section of the at least one blade radially outward or radially inward inside a plane of rotation of the first propeller.

13. The aerial vehicle of claim 10, wherein the first actuator comprises at least one of a tunable bias element or a magnetic actuator configured to alter a springiness of at least a portion of a coupling between the tip section of the at least one blade and a root of the at least one blade.

14. The aerial vehicle of claim 13, wherein at least one of a pitch or the orientation of the at least one blade of the first propeller is configured to be altered by the first actuator based at least in part on a thrust generated by the first propulsion mechanism.

15. The aerial vehicle of claim 6, wherein the first actuator comprises at least one of a clutch, a switch, a bias element, a servo, a solenoid, a motor, a screw actuator, a magnetic actuator, a linear actuator, or a rotary actuator.

16. The aerial vehicle of claim 6, further comprising:
a controller configured to at least:
detect a failure of a second propulsion mechanism of the plurality of propulsion mechanisms;
responsive to the detected failure, actuate the first actuator to alter at least one of the orientation or the length of the at least one blade of the first propeller;
identify a safe landing location for the aerial vehicle; and
navigate the aerial vehicle to the safe landing location.

17. The aerial vehicle of claim 6, further comprising:
a plurality of actuators, each actuator coupled to a respective propeller and configured to alter at least one of an orientation or a length of at least one blade of the respective propeller;
wherein the plurality of actuators comprise the first actuator.

* * * * *